United States Patent [19]

Stepp et al.

[11] Patent Number: 5,420,222
[45] Date of Patent: May 30, 1995

[54] CURABLE ORGANO(POLY)SILOXANE COMPOSITIONS

[75] Inventors: Michael Stepp; Johann Mueller, both of Burghausen; Werner Brennenstuhl, Burgkirchen, all of Germany

[73] Assignee: Wacker-Chemie GmbH, Munich, Germany

[21] Appl. No.: 167,907

[22] PCT Filed: Jun. 19, 1992

[86] PCT No.: PCT/EP92/01385

§ 371 Date: Dec. 17, 1993

§ 102(e) Date: Dec. 17, 1993

[87] PCT Pub. No.: WO93/00405

PCT Pub. Date: Jan. 7, 1993

[30] Foreign Application Priority Data

Jun. 20, 1991 [DE] Germany .................. 41 20 418.2

[51] Int. Cl.⁶ .................................... C08G 77/12
[52] U.S. Cl. .......................... 528/31; 528/30; 528/32; 522/99; 522/66
[58] Field of Search ............... 528/30, 31, 32; 522/99, 522/66

[56] References Cited

U.S. PATENT DOCUMENTS

| | | |
|---|---|---|
| 4,107,390 | 10/1978 | Gordon et al. . |
| 4,133,939 | 1/1979 | Bokerman et al. . |
| 4,273,907 | 6/1981 | Takamizawa . |
| 4,303,484 | 12/1981 | Takamizawa . |
| 4,359,369 | 11/1982 | Takamizawa et al. . |
| 4,477,326 | 10/1984 | Lin . |
| 4,507,187 | 3/1985 | Jacobine . |
| 4,534,838 | 8/1985 | Lin . |
| 4,579,636 | 4/1986 | Inoue . |
| 4,595,471 | 6/1986 | Preiner . |
| 4,699,802 | 10/1987 | Nakos . |
| 4,810,731 | 3/1989 | Hida . |
| 4,849,461 | 7/1989 | Lee . |
| 4,889,905 | 12/1989 | Suzuki . |
| 4,929,647 | 5/1990 | Burger et al. . |
| 4,935,455 | 6/1990 | Huy . |

FOREIGN PATENT DOCUMENTS

| | | |
|---|---|---|
| 0141380 | 5/1985 | European Pat. Off. . |
| 0153700 | 9/1985 | European Pat. Off. . |
| 0157540 | 10/1985 | European Pat. Off. . |
| 0174647 | 3/1986 | European Pat. Off. . |
| 0182941 | 6/1986 | European Pat. Off. . |
| 0228145 | 7/1987 | European Pat. Off. . |
| 0237757 | 9/1987 | European Pat. Off. . |
| 0283896 | 9/1988 | European Pat. Off. . |
| 0299450 | 1/1989 | European Pat. Off. . |
| 0315342 | 5/1989 | European Pat. Off. . |
| 0332400 | 9/1989 | European Pat. Off. . |
| 0336633 | 10/1989 | European Pat. Off. . |
| 2850611 | 6/1979 | Germany . |
| 2853766 | 6/1979 | Germany . |
| 3032626 | 3/1981 | Germany . |
| 3433654 | 3/1986 | Germany . |
| 2759766 | 4/1988 | Germany . |
| 4113554 | 11/1992 | Germany . |
| WO91/00795 | 1/1991 | WIPO . |

OTHER PUBLICATIONS

W. Noll "Chemie und Technologie der Silicone", Verlag Chemie Weinheim 2nd edition, 1968, p. 163 et seq.
W. Noll "Chemistry and Technology of Silicones", Academic Press Inc. pp. 191 et seq.
W. Noll "Chemie und Technologie der Silicone", Verlag Chemie Weinheim, 2nd edition, 1968, p. 556.
W. Noll "Chemistry and Technology of Silicones", Academic Press Inc. pp. 646 and 647.

*Primary Examiner*—Melvyn I. Marquis
*Attorney, Agent, or Firm*—Martin Connaughton

[57] ABSTRACT

Disclosed are organopolysiloxane preparations containing: A) units of the formula (I): $(R^1O)_aSiHR^2{}_{2-a}O_{\frac{1}{2}}$, in which $R^1$ and $R^2$, which may be the same or different, are each, independently of each other, an optionally substituted monovalent hydrocarbon group and a is 1 or 2, B) siloxane units which can be cross-linked by irradiating and, optionally, C) siloxane units acting as photoinitiators. These preparations are useful for the production of coatings.

7 Claims, No Drawings

CURABLE ORGANO(POLY)SILOXANE COMPOSITIONS

The invention relates to organo(poly)siloxane compositions which can be crosslinked both on access of moisture And by irradiation, and to their use for the production of coatings.

Organo(poly)siloxane compositions which cure via two different crosslinking mechanisms are in general called dual systems and are already known.

One problem of purely moisture-curing organo(poly)siloxane formulations is that the rate of the curing reaction of these formulations depends on the diffusion of water through the surface. Above a certain layer thickness, complete curing can no longer proceed as rapidly as on the surface, for example within a few seconds, so that the curable organo(poly)siloxane formulation of this type cannot be used for applications where the glueing or sealing properties of the substance must be achieved within a short time. On the other hand, radiation-curable organo(poly)siloxane mixtures have the disadvantage that although they cure rapidly where they are exposed to direct radiation, curing progresses only slowly in the shadow regions.

To avoid these disadvantages, attempts have therefore been made to combine both types of crosslinking. Reference may be made in this context to EP-A 182,941 (Loctite Corp.; published 4th Jun. 1986), U.S. Pat. No. 4,699,802 (Loctite Corp.; published 13th Oct. 1987), EP-A 315,342 (Dow Cotming Corp.; published 10th May 1989) and EP-A 332,400 (Shin-Etsu Chemical Co., Ltd.; published 13th Sep. 1989), in which organo(poly)siloxane compositions which also contain, in addition to units having acrylic functional groups or acrylamide functional groups, hydrolysable groups, such as alkoxy radicals, are described. U.S. Pat. No. 4,579,636 (Shin-Etsu Chemical Co., Ltd.; published 1st Apr. 1986) moreover describes compositions which are obtained by mixing hydroxyl-terminated organo(poly)siloxane with vinyltrialkoxysilane and organo(poly)siloxanes having mercapto functional groups and can be crosslinked by radiation and also by moisture. U.S. Pat. No. 4,889,905 (Toray Silicone Co., Ltd.; published 26th Dec. 1989) moreover describes compositions which can be cured by irradiation and are composed of an organo(poly)siloxane containing alkenyl functional groups, an organo(poly)siloxane containing mercapto functional groups and an organosilicon compound which contains both alkenyl groups and alkoxy groups.

There was the object of providing curable organo(poly)siloxane compositions.

The invention relates to organo(poly)siloxane compositions which contain (A) units of the formula

wherein

R$^1$ and R$^2$ independently of one another can in each case be identical or different and denote a monovalent, optionally substituted hydrocarbon radical and a is 1 or 2, (B) siloxane units which are crosslinkable by irradiation of the formula (II) and/or (III), and if appropriate (C) siloxane units which act as a photoinitiator of the formula (V).

R$^1$ and R$^2$ are in each case independently of one another preferably a monovalent, optionally substituted hydrocarbon radical having 1 to 13 carbon atom(s).

Examples of hydrocarbon radicals having 1 to 13 carbon atom(s) are alkyl radicals, such as the methyl, ethyl, n-propyl, iso-propyl, n-butyl, iso-butyl, tert-butyl, n-pentyl, iso-pentyl, neo-pentyl and tert-pentyl radical, hexyl radicals, such as the n-hexyl radical, heptyl radicals, such as the n-heptyl radical, octyl radicals, such as the n-octyl radical, and iso-octyl radicals, such as the 2,2,4-trimethylpentyl radical, nonyl radicals, such as the n-nonyl radical, decyl radicals, such as the n-decyl radical, and dodecyl radicals, such as the n-dodecyl radical; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl and the naphthyl radical; alkaryl radicals, such as o-, m- and p-tolyl radicals, xylyl radicals and ethylphenyl radicals; and aralkyl radicals, such as the benzyl radical and the alpha- and the β-phenethyl radical.

Examples of substituted hydrocarbon radicals are alkoxyalkyl radicals, such as the methoxyethyl radical, halogenoalkyl radicals, such as the trifluoropropyl radical, and acyloxyalkyl radicals, such as the acetoxyethyl radical.

R$^1$ is particularly preferably the ethyl radical.
R$^2$ is particularly preferably the methyl radical.
a is preferably 2.

Examples of siloxane units (A) of the formula (I) are (EtO)$_2$SiHO$_{\frac{1}{2}}$, (MeO)$_2$SiHO$_{\frac{1}{2}}$, (EtO)SiHMeO$_{\frac{1}{2}}$, (MeO)SiHMeO$_{\frac{1}{2}}$, (n-PropO)$_2$SiHO$_{\frac{1}{2}}$, (n-BuO)(EtO)SiHO$_{\frac{1}{2}}$ and (EtO)SiPhPO$_{\frac{1}{2}}$, where Me is the methyl radical, Et is the ethyl radical, Prop is the propyl radical, Bu is the butyl radical and Ph is the phenyl radical.

The content of siloxane units (A) is preferably between 0.1 and 66%, particularly preferably between 0.5 and 30%, in particular between 0.5 and 5%, in each case based on the total number of siloxane units present in the organosiloxane composition according to the invention.

The siloxane units (B) which can be crosslinked by irradiation are units of the formula

and/or

wherein

G is identical or different and denotes a monovalent organic radical having at least one thiol group, R$^3$ is identical or different and has one of the meanings given for R$^2$, b is 0, 1 or 2, preferably 1 or 2, particularly preferably 1, h is 1, 2 or 3, preferably 1 or 2, particularly preferably 1, R$^4$ is a monovalent organic radical having at least one aliphatic carbon-carbon multiple bond, R$^5$ can be identical or different and has one of the meanings given for R$^2$, c is 0, 1 or 2, preferably 1 or 2, particularly preferably 1, and i is 1, 2 or 3, preferably 1 or 2, particularly preferably 1, with the proviso that the sum of b+h and the sum of c+i is in each case less than or equal to 3.

Examples of the radical G are
—$(CH_2)_3SH$,
—$(CH_2)_6SH$,
—$(CH_2)_4CH(SH)CH_3$,
2-(3-mercapto-1-cyclohexyl)-1-ethyl,
2-(3,4-dimercapto-1-cyclohexyl)-1-ethyl,
—$(CH_2)_3O(CH_2)_3SH$,
—$(CH_2)_3OCH_2CH(SH)CH_2SH$,
—$(CH_2)_3OCH_2CH(SH)CH_3$,
—$(CH_2)_3OOCCH_2SH$,
—$(CH_2)_3OOC(CH_2)_2SH$,
—$(CH_2)_8SH$,
—$(CH_2)_6CH(SH)CH_3$,
—$(CH_2)_7SH$,
—$CH_2SH$,
—$(CH_2)_2SH$,
—$(CH_2)_5CH=CH(CH_2)_5SH$,
—$(CH_2)_5CH=CH(CH_2)_3CH(SH)CH_3$,
—$(CH_2)_5CH(SH)(CH_2)_4CH=CH_2$,
—$(CH_2)_6CH(SH)(CH_2)_3CH=CH_2$,
—$(CH_2)_6CH(SH)(CH_2)_3CH(SH)CH_3$,
—$(CH_2)_5CH(SH)(CH_2)_4CH(SH)CH_3$,
—$(CH_2)_5CH(SH)(CH_2)_6SH$,
—$(CH_2)_6CH(SH)(CH_2)_6SH$,
1-mercapto-4-cyclododec-8-enyl,
1-mercapto-5-cyclododec-8-enyl,
1,6-dimercapto-10-cyclododecyl,
1-mercapto-2-cyclobutyl,
1-mercapto-3-cyclobutyl,
1-mercapto-2-cyclopentyl,
1-mercapto-3-cyclopentyl,
1-mercapto-2-cyclohexyl,
1-mercapto-3-cyclohexyl,
1-mercapto-4-cyclohexyl,
1-mercapto-2-cycloheptyl,
1-mercapto-3-cycloheptyl,
1-mercapto-4-cycloheptyl,
1-mercapto-2-cyclooctyl,
1-mercapto-3-cyclooctyl,
1-mercapto-4-cyclooctyl,
1-mercapto-5-cyclooctyl,
1,2-dimercapto-4-cyclohexyl,
1-mercaptocyclohex-3-en-3-yl,
1-mercaptocyclohex-3-en-4-yl,
1-mercaptocyclohex-2-en-4-yl,
—$(CH_2)_3SCH_2CH(SH)CH_2SH$,
—$(CH_2)_3S(CH_2)_3SH$,
-ortho-$(CH_2)_3OC_6H_4SH$,
-meta-$(CH_2)_3OC_6H_4SH$,
-para-$(CH_2)_3OC_6H_4SH$,
-ortho-$(CH_2)_3OC_6H_4O(CH_2)_3SH$,
-meta-$(CH_2)_3OC_6H_4O(CH_2)_3SH$,
-para-$(CH_2)_3OC_6H_4O(CH_2)_3SH$,
-ortho-$(CH_2)_3C_6H_4SH$,
-meta-$(CH_2)_3C_6H_4SH$,
-para-$(CH_2)_3C_6H_4SH$,
-ortho-$C_6H_4SH$,
-meta-$C_6H_4SH$,
-para-$C_6H_4SH$,
—$(CH_2)OOC(CH_2)_{11}SH$ and
—$(CH_2)_3OOC(CH_2)_9CH(SH)CH_3$.

The radical G is preferably a linear or cyclic thioalkyl radical having 1 to 13 carbon atom(s), linear thioalkyl radicals having 3 to 13 carbon atoms, in particular —$(CH_2)_3SH$, —$(CH_2)_6SH$ and —$(CH_2)_4CH(SH)CH_3$, being particularly preferred.

The radical $R^3$ is preferably a monovalent hydrocarbon radical having 1 to 13 carbon atom(s), the methyl radical being particularly preferred.

Examples of units of the formula (II) are
$H_3CSiO_{2/2}[—(CH_2)_3SH]$,
$H_3CSiO_{2/2}[—(CH_2)_6SH]$,
$H_3CSiO_{2/2}[—(CH_2)_4CH(SH)CH_3]$,
$(H_3C)_2SiO_{1/2}[—(CH_2)_3SH]$,
$SiO_{3/2}[—(CH_2)_3SH]$,
$(H_3C)_2SiO_{1/2}[—(CH_2)_6SH]$,
$SiO_{3/2}[—(CH_2)_6SH]$,
$(H_3C)_2SiO_{2/2}[—(CH_2)_4CH(SH)CH_3]$,
$SiO_{3/2}[—(CH_2)_4CH(SH)CH_3]$,
$H_3CSiO_{2/2}[2-(3-mercapto-1-cyclohexyl)-1-ethyl-]$,
$H_3CSiO_{2/2}[-2-(3,4-dimercapto-1-cyclohexyl)-1-ethyl-]$,
$H_3CSiO_{2/2}[—(CH_2)_3O(CH_2)_3SH]$,
$H_3CSiO_{2/2}[—(CH_2)_3OOCCH_2SH]$,
$H_3CSiO_{2/2}[—(CH_2)_3OOC(CH_2)_2SH]$,
$H_3CSiO_{2/2}[—(CH_2)_3OOC(CH_2)_{11}SH]$,
$SiO_{2/2}[—(CH_2)_3SH]_2$,
$H_3CSiO_{2/2}[—(CH_2)_8SH]$,
$(H_3C)_2SiO_{2/2}[—(CH_2)_8SH]$,
$SiO_{3/2}[—(CH_2)_8SH]$,
$H_3CSiO_{2/2}[—(CH_2)_5CH=CH(CH_2)_5SH]$,
$(H_3C)_2SiO_{2/2}[—(CH_2)_5CH=CH(CH_2)_5SH]$,
$SiO_{3/2}[—(CH_2)_5CH=CH(CH_2)_5SH]$,
$H_3CSiO_{2/2}[—(CH_2)_6CH(SH)(CH_2)_3CH(SH)CH_3]$,
$(H_3C)_2SiO_{2/2}[—(CH_2)_6CH(SH)(CH_2)_3CH(SH)ch_3]$,
$SiO_{3/2}[—(CH_2)_6CH(SH)(CH_2)_3CH(SH)CH_3]$,
$(H_3C)_2SiO_{2/2}[2-(3-mercapto-1-cyclohexyl)-1-ethyl-]$,
$SiO_{3/2}[2-(3-mercapto-1-cyclohexyl)-1-ethyl-]$,
$(H_3C)_2SiO_{2/2}[2-(3,4-dimercapto-1-cyclohexyl)-1-ethyl-]$,
$SiO_{3/2}[2-(3,4-dimercapto-1-cyclohexyl)-1-ethyl-]$,
$(H_3C)_2SiO_{2/2}[—(CH_2)_3O(CH_2)_3SH]$,
$SiO_{3/2}[—(CH_2)_3O(CH_2)_3SH]$,
$(H_3C)_2SiO_{2/2}[—(CH_2)_3OOCCH_2SH]$,
$SiO_{3/2}[—(CH_2)_3OOCCH_2SH]$,
$(H_3C)_3SiO_{1/2}[—(CH_2)_3OOC(CH_2)_2SH]$,
$SiO_{3/2}[—(CH_2)_3OOC(CH_2)_2SH]$,
$(H_3C)_2SiO_{2/2}[—(CH_2)_3OOC(CH_2)_{11}SH]$,
$SiO_{3/2}[—(CH_2)_3OOC(CH_2)_{11}SH]$,
$SiO_{2/2}[1-mercaptocyclohex-3-en-3-yl-]_2$,
$SiO_{1/2}[-para-(CH_2)_3OC_6H_4SH]_3$,
$H_3CSiO_{2/2}[-meta-(CH_2)_3OC_6H_4O(CH_2)_3SH]$,
$(H_3C)_2SiO_{1/2}[-para-(CH_2)_3C_6H_4SH]$ and
$SiO_{3/2}[—(CH_2)_3OOC(CH_2)_9CH(SH)CH_3]$.

The units of the formula (II) are preferably
$(H_3C)_2SiO_{2/2}[—(CH_2)_3SH]$,
$SiO_{3/2}[—(CH_2)_3SH]$,
$(H_3C)_2SiO_{1/2}[—(CH_2)_6SH]$,
$SiO_{3/2}[—(CH_2)_6SH]$,
$(H_3C)_2SiO_{2/2}[—(CH_2)_4CH(SH)CH_3]$,
$SiO_{3/2}[—(CH_2)_4CH(SH)CH_3]$,
$H_3CSiO_{2/2}[2-(3-mercapto-1-cyclohexyl)-1-ethyl-]$,
$H_3CSiO_{2/2}[2-(3,4-dimercapto-1-cyclohexyl)-1-ethyl-]$,
$H_3CSiO_{2/2}[—(CH_2)_3O(CH_2)_3SH]$,
$H_3CSiO_{2/2}[—(CH_2)_3OOCCH_2SH]$,
$H_3CSiO_{2/2}[—(CH_2)_3OOC(CH_2)_2SH]$,
$H_3CSiO_{2/2}[—(CH_2)_3OOC(CH_2)_{11}SH]$,
$H_3CSiO_{2/2}[—(CH_2)_3SH]$,
$H_3CSiO_{2/2}[—(CH_2)_6SH]$ and
$H_3CSiO_{2/2}[—(CH_2)_4CH(SH)CH_3]$,
$H_3CSiO_{2/2}[—(CH_2)_3SH]$,
$H_3CSiO_{2/2}[—(CH_2)_6SH]$ and
$H_3CSiO_{2/2}[—(CH_2)_4CH(SH)CH_3]$ being particularly preferred.

The radical R⁴ is preferably a radical which has 2 to 18 carbon atoms and contains at least one aliphatic carbon-carbon multiple bond.

Examples of radicals R⁴ are the vinyl radical, allyl radical, propargyl radical, allenyl radical, n-but-3-enyl radical, n-hex-5-enyl radical, n-undec-10-enyl radical, 3-allyloxyphenyl radical, 4-allyloxyphenyl radical, 4-allyloxy-2-methylphenyl radical, 4-allyloxybenzyl radical, 4-allyloxy-phenoxy-phenyl radical and prop-2-inoxy-n-propyl radical, endocyclic radicals containing a carbon-carbon multiple bond, such as, for example,

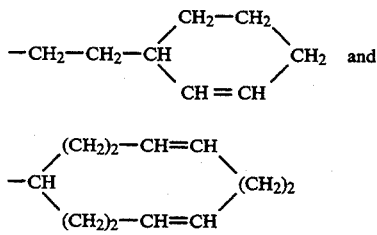

and radicals of the formula $$YO(CO)_o(CH_2)_pCR^6=CH_2 \quad (IV)$$

wherein Y denotes a divalent organic radical, R⁶ denotes a hydrogen atom or an alkyl radical having 1 to 6 carbon atom(s), o is 0 or 1 and p is an integer between 1 and 8, such as, for example,

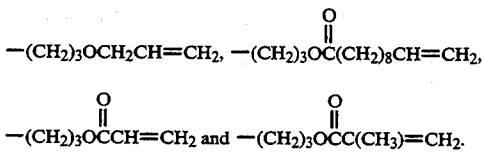

Examples of the radical Y are alkylene radicals, such as the n-propylene, iso-propylene, 1-n-butylene, 2-n-butylene, iso-butylene, tert-butylene, n-pentylene, iso-pentylene, neo-pentylene and tert-pentylene radical, hexylene radicals, such as the n-hexylene radical, heptylene radicals, such as the n-heptylene radical, octylene radicals, such as the n-octylene radical, and iso-octylene radicals, such as the 2,2,4-trimethylpentylene radical, nonylene radicals, such as the n-nonylene radical, and decylene radicals, such as the n-decylene radical, as well as cycloalkylene radicals, such as cyclopentylene, cyclohexylene and cycloheptylene radicals and methylcyclohexylene radicals, arylene, aralkylene and alkarylene radicals, such as 1,4-phenylene, 1,3-phenylene, 4,4'-biphenylene, 3,3'-biphenylene, 3,4'-biphenylene, 1,4-naphthalenediyl, 1,5-naphthalenediyl, 1,4-anthraquinonediyl, 1,5-anthraquinonediyl, 2,6-anthraquinonediyl, diphenylmethane-4,4'-diyl, 2,2-bis-phenylpropane-4,4'-diyl, 2,2-bisphenylperfluoropropane-4,4'-diyl, 3,3-bisphenylphthalide-4,4'-diyl and bis-phenylsulphone-4,4'-diyl radicals, cyanoalkylene radicals, such as the β-cyanoethylene radical, and halogenated hydrocarbon radicals, for example halogenoalkylene radicals, such as the 2,2-difluoro-n-propylene radical and the 2,2,2',2',2'-hexafluoroisopropylene radical, and halogenoarylene radicals, such as the o-, m- and p-chlorophenylene radical, as well as optionally substituted m- or p-propyloxyphenylene radicals,

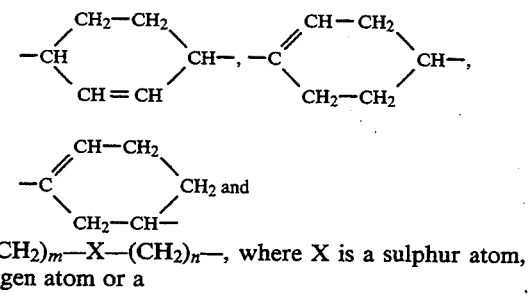

$-(CH_2)_m-X-(CH_2)_n-$, where X is a sulphur atom, oxygen atom or a

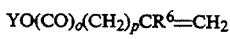

group and m and n each independently of one another are an integer between 1 and 13, such as, for example, $-(CH_2)_3O(CH_2)_2-$ and $$-(CH_2)_3-O\overset{O}{\overset{\|}{C}}(CH_2)_2-.$$

The radical Y is preferably a linear or cyclic alkyl radical, linear alkyl radicals having at least 3 carbon atoms being particularly preferred.

The radical R⁴ is particularly preferably a linear or cyclic alkenyl radical or acryloxyalkyl radical or methacryloxyalkyl radical, in each case having 2 to 12 carbon atoms.

The radical R⁴ is, in particular, the vinyl radical, if radicals of the formula (II) are present in the compositions according to the invention, or the 3-acryloxy-1-propyl radical, if the compositions according to the invention contain no radicals of the formula (II).

The radical R⁵ is preferably a monovalent hydrocarbon radical having 1 to 13 carbon atom(s), the methyl radical being particularly preferred.

Examples of siloxane units of the formula (III) are
$H_2C=CH-Si(CH_3)_2O_{\frac{1}{2}}$,
$H_2C=CH-(CH_2)_4Si(CH_3)_2O_{\frac{1}{2}}$,
$H_2C=CH-(CH_2)_4Si(CH_3)O_{2/2}$,
$H_2C=CH-(CH_2)_4SiO_{3/2}$,
$H_2C=CHCOO(CH_2)_3Si(CH_3)O_{2/2}$,
$H_2C=C(CH_3)COO(CH_2)_3Si(CH_3)O_{2/2}$,
$H_2C=CH-Si(CH_3)O_{2/2}$,
$H_2C=CH-SiO_{3/2}$,
$H_2C=CH-CH_2Si(CH_3)_2O_{\frac{1}{2}}$,
$H_2C=CH-CH_2Si(CH_3)O_{2/2}$,
$H_2C=CH-CH_2SiO_{3/2}$,
$H_2C=CH-CH_2O(CH_2)_3Si(CH_3)O_{2/2}$,
$(1\text{-cyclododeca-4,8-dienyl})Si(CH_3)O_{2/2}$,
$<2\text{-(bicyclo[2.2.1]hept-1-en-4-yl)-1-ethyl-}>Si(CH_3)O_{2/2}$,
$<2\text{-(cyclohex-1-en-4-yl)-1-ethyl-}>Si(CH_3)_{2/2}$,
$H_2C=CH-(CH_2)_8COO(CH_2)_3Si(CH_3)O_{2/2}$,
$H_2C=CHCOO(CH_2)_3Si(CH_3)_2O_{\frac{1}{2}}$,
$H_2C=C(CH_3)COO(CH_2)_3Si(CH_3)_2O_{\frac{1}{2}}$,
$H_2C=CHCOO(CH_2)CH(OOCCH=CH_2)C-H_2O(CH_2)_3Si(CH_3)O_{2/2}$,
$H_2C=C(CH_3)COO(CH_2)CH(OOCC(CH_3)=CH_2O)C-H_2O(CH_2)_3Si(CH_3)O_{2/2}$,
$(H_2C=CH-)_2Si(CH_3)O_{\frac{1}{2}}$,
$(H_2C=CH-)_3SiO_{\frac{1}{2}}$,
$(H_2C=CH-)_2SiO_{2/2}$,
$H_2C=CH-(CH_2)_3Si(CH_3)_2O_{\frac{1}{2}}$,
$H_2C=CH-(CH_2)_3Si(CH_3)O_{2/2}$, $H_2C=CH-(CH_2)_3SiO_{3/2}$,
$H_2C=CH-(CH_2)_2Si(CH_3)_2O_{\frac{1}{2}}$,
$H_2C=CH-(CH_2)_2Si(CH_3)O_{2/2}$,
$H_2C=CH-(CH_2)_2SiO_{3/2}$,
$H_2C=CH-Si(C_6H_5)O_{2/2}$,
$H_2C=CH_2Si(C_6H_5)O_{2/2}$,
$H_2C=CH-CH_2O(CH_2)_3Si(CH_3)_2O_{\frac{1}{2}}$,
$H_2C=CH-CH_2O(CH_2)_3SiO_{3/2}$,
$H_2C=CH-CH_2OC_6H_4O(CH_2)_3Si(CH_3)_2O_{\frac{1}{2}}$,
$H_2C=CH-CH_2OC_6H_4O(CH_2)_3Si(CH_3)O_{2/2}$,
$H_2C=CH-CH_2OC_6H_4O(CH_2)_3SiO_{3/2}$,
$H_2C=CH-CH_2OC_6H_4(CH_2)Si(CH_3)_2O_{\frac{1}{2}}$,
$H_2C=CH-CH_2OC_6H_4(CH_2)Si(CH_3)O_{2/2}$,
$H_2C=CH-CH_2OC_6H_4(CH_2)SiO_{3/2}$,
$H_2C=CH-C_6H_4(CH_2)_2Si(CH_3)_2O_{\frac{1}{2}}$,
$H_2C=CH-C_6H_4(CH_2)_2Si(CH_3)O_{2/2}$,
$H_2C=CH-C_6H_4(CH_2)_2SiO_{3/2}$,
$H_2C=CH-(CH_2)_3HC=CH(CH_2)_5Si(CH_3)_2O_{\frac{1}{2}}$,
$H_2C=CH-(CH_2)_3HC=CH(CH_2)_5Si(CH_3)O_{2/2}$,
$H_2C=CH-(CH_2)_3HC=CH(CH_2)_5SiO_{3/2}$,
$HC\equiv C-CH_2-O-CH_2-CH=CH_2Si(CH_3)O_{2/2}$,
$HC\equiv C-CH_2-O-CH_2-CH=CH_2Si(CH_3)_2O_{\frac{1}{2}}$,
$HC\equiv C-CH_2-O-CH_2-CH=CH_2SiO_{3/2}$,
$HC\equiv C-CH_2Si(CH_3)O_{2/2}$,
$HC\equiv C-CH_2Si(CH_3)_2O_{\frac{1}{2}}$,
$HC\equiv C-CH_2SiO_{3/2}$,
$(HC\equiv C-CH_2)_2SiO_{2/2}$,
$HC=C=CH-Si(CH_3)O_{2/2}$,
$HC=C=CH-Si(CH_3)_2O_{\frac{1}{2}}$,
$HC=C=CH-SiO_{3/2}$,
$HC\equiv C-CH_2-O-(CH_2)_3Si(CH_3)O_{2/2}$,
$HC\equiv C-CH_2-O-(CH_2)_3Si(CH_3)_2O_{\frac{1}{2}}$,
$HC\equiv C-CH_2-O-(CH_2)_3SiO_{3/2}$,
$H_3COOCC\equiv C-(CH_2)_4-Si(CH_3)O_{2/2}$,
(1-cyclododeca-4,8-dienyl)$Si(CH_3)_2O_{\frac{1}{2}}$,
(1-cyclododeca-4,8-dienyl)$SiO_{3/2}$,
<2-(bicyclo[2.2.1]hept-1-en-4-yl)-1-ethyl->$Si(CH_3)_2O_{\frac{1}{2}}$,
<2-(bicyclo[2.2.1]hept-1en-4-yl)-1-ethyl->$SiO_{3/2}$,
<2-(cyclohex-1-en-4-yl)-1-ethyl->$Si(CH_3)_2O_{\frac{1}{2}}$,
<2-(cyclohex-1-en-4-yl)-1-ethyl->$SiO_{3/2}$,
$H_2C=CH-(CH_2)_8COO(CH_2)_3Si(CH_3)_2O_{\frac{1}{2}}$,
$H_2C=CH-(CH_2)_8COO(CH_2)_3SiO_{3/2}$,
$H_2C=CHCOO(CH_2)_3SiO_{3/2}$,
$H_2C=CHCOO(CH_2)_6Si(CH_3)O_{2/2}$,
$H_2C=CHCOO(CH_2)_6Si(CH_3)_2O_{\frac{1}{2}}$,
$H_2C=CHCOO(CH_2)_6SiO_{3/2}$,
$H_2C=CHCOO(CH_2)_3C_6H_4(CH_2)_3Si(CH_3)O_{2/2}$,
$H_2C=CHCOO(CH_2)_3C_6H_4(CH_2)_3Si(CH_3)_2O_{\frac{1}{2}}$,
$H_2C=CHCOO(CH_2)_3C_6H_4(CH_2)_3SiO_{3/2}$,
$H_2C=C(CH_3)COO(CH_2)_3SiO_{3/2}$,
$H_2C=C(CH_3)COO(CH_2)_3C_6H_4(CH_2)_3Si(CH_3)O_{2/2}$,
$H_2C=C(CH_3)COO(CH_2)_3C_6H_4(CH_2)_3Si(CH_3)_2O_{\frac{1}{2}}$,
$H_2C=C(CH_3)COO(CH_2)_3C_6H_4(CH_2)_3SiO_{3/2}$,
$H_2C=CHCOO(CH_2)CH(OOCCH=CH_2)CH_2O(CH_2)_3Si(CH_3)_2O_{\frac{1}{2}}$,
$H_2C=CHCOO(CH_2)CH(OOCCH=CH_2)CH_2O(CH_2)_3SiO_{3/2}$,
$H_2C=C(CH_3)COO(CH_2)CH(OOCC(CH_3)=CH_2)CH_2O(CH_2)_3Si(CH_3)_2O_{\frac{1}{2}}$,
$H_2C=C(CH_3)COO(CH_2)CH(OOCC(CH_3)=CH_2)CH_2O(CH_2)_3SiO_{3/2}$,
$H_2C=CHCOO(CH_2CH_2O)_3C_6H_4(CH_2)_3Si(CH_3)O_{2/2}$,
$H_2C=CHCOO(CH_2CH_2O)_3C_6H_4(CH_2)_3Si(CH_3)_2O_{\frac{1}{2}}$,
$H_2C=CHCOO(CH_2CH_2O)_3C_6H_4(CH_2)_3SiO_{3/2}$,
$H_2C=CHCOO(CH_2)_6OOC(CH_2)_2Si(CH_3)O_{2/2}$,
$H_2C=CHCOO(CH_2)_6OOC(CH_2)_2Si(CH_3)_2O_{\frac{1}{2}}$,
$H_2C=CHCOO(CH_2)_6OOC(CH_2)_2SiO_{3/2}$,
$H_2C=CHCOO(CH_2CH_2O)_3(CH_2)_3Si(CH_3)O_{2/2}$,
$H_2C=CHCOO(CH_2CH_2O)_3(CH_2)_3Si(CH_3)_2O_{\frac{1}{2}}$,
$H_2C=CHCOO(CH_2CH_2O)_3(CH_2)_3SiO_{3/2}$,
$H_2C=CHCOO(CH_2CH_2O)_4OC(CH_2)_2Si(CH_3)O_{2/2}$,
$H_2C=CHCOO(CH_2CH_2O)_4OC(CH_2)_2Si(CH_3)_2O_{\frac{1}{2}}$,
$H_2C=CHCOO(CH_2CH_2O)_4OC(CH_2)_2SiO_{3/2}$,
<$H_2C=C(CH_3)COO(CH_2)_3$>$_2SiO_{2/2}$ and
<$H_2C=C(CH_3)COO(CH_2)_3$>$_3SiO_{\frac{1}{2}}$.

The units of the formula (III) are preferably
$H_2C=CH-Si(CH_3)O_{2/2}$,
$H_2C=CH-SiO_{3/2}$,
$H_2C=CH-CH_2Si(CH_3)_2O_{\frac{1}{2}}$,
$H_2C=CH-CH_2Si(CH_3)O_{2/2}$,
$H_2C=CH-CH_2SiO_{3/2}$,
$H_2C=CH-CH_2O(CH_2)_3Si(CH_3)O_{2/2}$,
(1-cyclododeca-4,8-dienyl)$Si(CH_3)O_{2/2}$,
<2-(bicyclo[2.2.1]hept-1-en-4-yl)-1-ethyl->$Si(CH_3)O_{2/2}$,
<2-(cyclohex-1-en-4-yl)-1-ethyl->$Si(CH_3)O_{2/2}$,
$H_2C=CH-(CH_2)_8COO(CH_2)_3(CH_3)O_{2/2}$,
$H_2C=CHCOO(CH_2)_3Si(CH_3)_2O_{\frac{1}{2}}$,
$H_2C=C(CH_3)COO(CH_2)_3Si(CH_3)_2O_{\frac{1}{2}}$,
$H_2C=CHCOO(CH_2)CH(OOCCH=CH_2)CH_2O(CH_2)_3Si(CH_3)O_{2/2}$,
$H_2C=C(CH_3)COO(CH_2)CH(OOCC(CH_3)=CH_2)CH_2O(CH_2)_3Si(CH_3)O_{2/2}$,
$H_2C=CH-Si(CH_3)_2O_{\frac{1}{2}}$,
$H_2C=CH-(CH_2)_4Si(CH_3)_2O_{\frac{1}{2}}$,
$H_2C=CH-(CH_2)_4Si(CH_3)O_{2/2}$,
$H_2C=CH-(CH_2)_4SiO_{3/2}$,
$H_2C=CHCOO(CH_2)_3Si(CH_3)O_{2/2}$ and
$H_2C=C(CH_3)COO(CH_2)_3Si(CH_3)O_{2/2}$,
$H_2C=CH-Si(CH_3)O_{2/2}$,
$H_2C=CH-Si(CH_3)_2O_{\frac{1}{2}}$,
$H_2C=CH-(CH_2)_4Si(CH_3)_2O_{\frac{1}{2}}$,
$H_2C=CH-(CH_2)_4Si(CH_3)O_{2/2}$,
$H_2C=CH-(CH_2)_4SiO_{3/2}$,
$H_2C=CHCOO(CH_2)_3Si(CH_3)O_{2/2}$ and
$H_2C=C(CH_3)COO(CH_2)_3Si(CH_3)O_{2/2}$ being particularly preferred.

The organo(poly)siloxane compositions according to the invention preferably contain, as siloxane units (B) which can be cured by radiation, both units of the formula (II) and units of the formula (III). The ratio of the number of units of the formula (II) to units of the formula (III) here is preferably in the range from 0.1 to 10, preferably between 0.3 and 1 and in particular 0.5. If $R^4$ in formula (III) exclusively has the meaning of a radical containing acrylic functional groups and/or a radical containing methacrylic functional groups, siloxane units of the formula (II) can be dispensed with in the organo(poly)siloxane composition according to the invention.

The content of siloxane units (B) is preferably between 0.1 and 66%, particularly preferably between 0.5 and 30%, in particular between 0.5 and 5%, in each case based on the total number of siloxane units present in the organo(poly)siloxane composition according to the invention.

The siloxane units (C) which act as a photoinitiator are those of the formula $$(R^7O)_dR^8_eHZ_gSiO_{(3-d-e-g)/2} \qquad (V)$$

wherein
$R^7$ is identical or different and has one of the meanings given for $R^1$,
$R^8$ is identical or different and has one of the meanings given for $R^2$, Z is identical or different and denotes a group which forms free radicals by irradiation,
d is 0 or 1, preferably 1,
e is 0 or 1, preferably 0, and
g is 1 or 2, preferably 1, with the proviso that in formula (V) the sum of d, e and g is less than or equal to 2.

Examples of the radical Z are
2-methyl-1-phenyl-1-propanon-2-oxy,
1-hydroxycyclohexyl phenyl ketone,
1-(4-methoxyphenyl)-2-methyl-1-propanon-2-oxy,
1-hydroxy-2-cyclohexen-1-yl phenyl ketone,
3-methoxy-2-methyl-1-phenyl-1-propanon-2-oxy,
2-ethyl-1-phenyl-1-hexanon-2-oxy,
2-methyl-1-(4-tolyl)-1-propanon-2-oxy,
1-(4-ethylphenyl)-2-methyl-1-propanon-2-oxy,
1-(4-cumyl)-2-methyl-1-propanon-2-oxy,
1-(4-tert-butylphenyl)-2-methyl-1-propanon-2-oxy,
1-(4-dodecylphenyl)-2-methyl-1-propanon-2-oxy,
2-ethyl-1-(4-tolyl)-1-hexanon-2-oxy,
1-(4-tert-butylphenyl)-2-ethyl-1-hexanon-2-oxy,
1-(3,4-dimethylphenyl)-2-methyl-1-propanon-2-oxy,
1-(2,4-dimethylphenyl)-2-methyl-1-propanon-2-oxy,
1-(2,5-dimethylphenyl)-2-methyl-1-propanon-2-oxy,
1-(3-chloro-4-methylphenyl)-2-methyl-1-propanon-2-oxy,
1-(3-chlorophenyl)-2-methyl-1-propanon-2-oxy,
1-(4-fluorophenyl)-2-methyl-1-propanon-2-oxy,
2-ethyl-1-(4-fluorophenyl)-1-hexanon-2-oxy,
2-ethyl-1-(4-methoxyphenyl)-1-hexanon-2-oxy,
2-methyl-1-(4-phenoxyphenyl)-1-propanon-2-oxy,
2-methyl-1-(4-phenylthiophenyl)-1-propanon-2-oxy,
2-methyl-1-phenyl-1-butanon-2-oxy,
2-ethyl-1-phenyl-1-butanon-2-oxy,
2,4-dimethylphenyl 1-hydroxycyclohexyl ketone,
1-hydroxycyclopentyl phenyl ketone,
1-hydroxycyclobutyl phenyl ketone,
1-hydroxy-3,4-dimethyl-3-cyclohexen-1-yl phenyl ketone,
1-hydroxy-4-methyl-3-cyclohexen-1-yl phenyl ketone,
1-hydroxy-3-cyclohexen-1-yl phenyl ketone,
3-benzyloxy-2-methyl-1-phenyl-1-propanon-2-oxy,
2-methyl-3-morpholino-1-phenyl-1-propanon-2-oxy and
methyl 4-methyl-5-phenyl-5-oxo-pentanoate-4-oxy.

The radical Z is preferably a group which is bonded to the silicon atom via oxygen and forms free radicals by irradiation, particularly preferred radicals being
1-(4-methoxyphenyl)-2-methyl-1-propanon-2-oxy,
1-hydroxy-2-cyclohexen-1-yl phenyl ketone,
3-methoxy-2-methyl-1-phenyl-1-propanon-2-oxy,
2-methyl-1-phenyl-1-propanon-2-oxy and
1-hydroxycyclohexyl phenyl ketone, especially 2-methyl-1-phenyl-1-propanon-2-oxy and 1-hydroxycyclohexyl phenyl ketone.

The radical $R^7$ is preferably a linear alkyl radical having 1 to 13 carbon atom(s), the ethyl radical being particularly preferred.

The radical $R^8$ is preferably a linear alkyl radical having 1 to 13 carbon atom(s), the methyl radical being particularly preferred.

Examples of siloxane units (C) are
SiH(OEt)(O—C(CH$_3$)$_2$—COPh)O$_{\frac{1}{2}}$, SiH(CH$_3$)(O—C(CH$_3$)$_2$—COPh)O$_{\frac{1}{2}}$,
SiH(O—C(CH$_3$)$_2$—COPh)O$_{2/2}$, SiH(O—C(CH$_3$)$_3$—COPh)$_2$O$_{\frac{1}{2}}$,
SiH(OCH$_3$)(O—C(CH$_3$)$_2$—COPh)O$_{\frac{1}{2}}$, SiH(OOC—CO—Ph)$_2$O$_{\frac{1}{2}}$,
SiH(CH$_3$)(PhCO—CO(CH$_2$OSi(CH$_3$)$_3$)Ph)O$_{\frac{1}{2}}$ and
SiH(OC$_3$H$_7$)(meta-O—C$_6$H$_4$(CO)$_2$Ph)O$_{\frac{1}{2}}$ where Ph is the phenyl radical and Et is the ethyl radical.

Preferred siloxane units (C) are
SiH(OEt)(O—C(CH$_3$)$_2$—COPh)O$_{\frac{1}{2}}$, SiH(CH$_3$)(O—C(CH$_3$)$_2$—COPh)O$_{\frac{1}{2}}$,
SiH(O—C(CH$_3$)$_2$—COPh)O$_{2/2}$ and SiH(O—C(CH$_3$)$_2$—COPh)$_2$O$_{\frac{1}{2}}$,
SiH(OEt)(O—C(CH$_3$)$_2$—COPh)O$_{\frac{1}{2}}$ and SiH(CH$_3$)(O—C(CH$_3$)$_2$—COPh)O$_{\frac{1}{2}}$
being particularly preferred and Ph denoting the phenyl radical and Et the ethyl radical.

If siloxane units (C) are present in the organo(poly)siloxane compositions according to the invention, the content thereof is preferably between 1 and 100%, particularly preferably between 5 and 50%, in each case based on the total number of siloxane units (B) present in the organosiloxane composition according to the invention.

The ratio of the number of siloxane units (A) to siloxane units (B) is preferably 20:1 to 1:100, particularly preferably 2:1 to 1:50.

The organopolysiloxane compositions according to the invention can furthermore contain units of the general formula

$$R_kSiO_{(4-k)/2} \quad (VI)$$

wherein
R is identical or different and has one of the meanings given for $R^2$ and
k is 0, 1, 2 or 3, preferably 2.

The radical R is preferably a hydrocarbon radical having 1 to 13 carbon atom(s), the methyl radical being particularly preferred.

The siloxane units of the formula (VI) are particularly preferably dialkylsiloxy groups, in particular dimethylsiloxy groups.

The content of siloxane units of the formula (VI) is preferably between 1 and 99.9%, particularly preferably between 60 and 99%, in each case based on the total number of siloxane units present in the organosiloxane composition according to the invention. However, the organo(poly)siloxane compositions according to the invention can also contain a minor amount of other siloxane units—partly as a result of the preparation—such as, for example, siloxane units containing hydroxyl groups and HSiO$_{3/2}$, HSiR$^2$O$_{2/2}$, R$^2$Si(OR$^1$)O$_{2/2}$ and/or HSi(OR$^1$)O$_{2/2}$ units, in which R$^1$ and R$^2$ in each case have one of the meanings given above for these radicals.

The compositions according to the invention can contain one type of organo(poly)siloxane or a mixture of several types of organo(poly)siloxanes. The siloxane units (A), (B) and if appropriate (C) can belong to one and the same organo(poly)siloxane molecule. However, it is also possible for each of the siloxane units (A), (B) and if appropriate (C) to be present separately on different organo(poly)siloxane molecules.

For example, the organo(poly)siloxane compositions according to the invention can contain (B), such as, for example, the organo(poly)siloxanes which have an aliphatic carbon-carbon multiple bond and are described in the international application having the application number PCT/EP91/00795 (Wacker-Chemie GmbH, application date 25th Apr. 1991) and in the German application having the application number P4113554.7 (Wacker-Chemie GmbH, application date 25th Apr. 1991).

The present invention thus furthermore relates to organo(poly)siloxanes which contain
(A) units of the formula (I) and
(B) siloxane units which can be crosslinked by irradiation.

The organo(poly)siloxanes described in formula (I) of the international application having the application number PCT/EP91/00795 (Wacker-Chemie GmbH, application date 25th Apr. 1991) are those of the formula

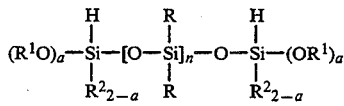

wherein
R, $R^1$ and $R^2$ independently of one another can in each case be identical or different and denote a monovalent, optionally substituted hydrocarbon radical, preferably a monovalent, optionally substituted hydrocarbon radical having 1 to 13 carbon atoms,
n is an integer of at least 2, preferably between 10 and 2500, particularly preferably between 10 and 1000, in particular between 20 and 500, and
a is 1 or 2, preferably 2.

The organopolysiloxanes described in formula (I) of the German application having the application number P4114554.7 (Wacker-Chemie GmbH, application date 25th Apr. 1991) are those of the formula $(R^1O)_a HSiR_{2-a}O[SiR_2O]_n SiR_2R^2$ in which R and $R^2$ are in each case identical or different and denote a monovalent, optionally substituted hydrocarbon radical, $R^1$ is identical or different and denotes a monovalent, optionally substituted hydrocarbon radical, n is an integer of at least 2 and a is 1 or 2.

The organo(poly)siloxanes according to the invention which contain siloxane units (A) and (B) are preferably those which contain units of the formula (I), (II) and/or (III) and (SiR$_2$O) units where R has the abovementioned meaning.

The organo(poly)siloxanes according to the invention which contain siloxane units (A) and (B) are particularly preferably those consisting of 0.5 to 10% of siloxane units of the formula (I), 0.5 to 20% of siloxane units of the formula (II) and/or (III) and 70 to 99% of (SiR$_2$O) units where R has the abovementioned meaning, based on the total number of siloxane units in the molecule.

Examples of such organo(poly)siloxanes are
[HSi(OEt)$_2$O$_½$]$_2$[SiMe$_2$O$_{2/2}$]$_{65}$[SiVinylMeO$_{2/2}$]$_4$-[Si((CH$_2$)$_3$SH)MeO$_{2/2}$]$_2$,
[HSi(OEt)$_2$O$_½$]$_2$[SiMe$_2$O$_{2/2}$]$_{135}$[SiVinylMeO$_{2/2}$]$_4$-[Si((CH$_2$)$_3$SH)MeO$_{2/2}$]$_2$,
[HSi(OEt)$_2$O$_½$]$_2$[SiMe$_2$O$_{2/2}$]$_{334}$[SiVinylMeO$_{2/2}$]$_8$-[Si((CH$_2$)$_3$SH)MeO$_{2/2}$]$_7$,
[HSi(OEt)$_2$O$_½$]$_2$[SiMe$_2$O$_{2/2}$]$_{258}$[SiVinylMeO$_{2/2}$]$_6$-[Si((CH$_2$)$_3$SH)MeO$_{2/2}$]$_4$,
[HSi(OEt)MeO$_½$]$_2$[SiMe$_2$O$_{2/2}$]$_{65}$[SiVinylMeO$_{2/2}$]-[Si((CH$_2$)$_3$SH)MeO$_{2/2}$]$_2$,
[HSi(OEt)$_2$O$_½$]$_2$[SiMe$_2$O$_{2/2}$]$_{64}$[SiMeCH$_2$CH = CH$_2$O$_{2/2}$]$_7$[SiMe(CH$_2$)$_3$OOC(CH$_2$)$_2$SHO$_{2/2}$]$_3$,
[HSi(OEt)$_2$O$_½$]$_2$[SiMe$_2$O$_{2/2}$]$_{545}$[SiVinylMeO$_{2/2}$]$_{67}$-[Si((CH$_2$)$_3$SH)MeO$_{2/2}$]$_{33}$,
[HSi(OEt)$_2$O$_½$]$_3$[SiMe$_2$O$_{2/2}$]$_{258}$[SiVinylMeO$_{2/2}$]$_6$-[Si((CH$_2$)$_3$SH)MeO$_{2/2}$]$_4$[SiMeO$_{3/2}$]$_1$,
[HSi(OMe)$_2$O$_½$]$_2$[SiMe$_2$O$_{2/2}$]$_{65}$[SiVinylMeO$_{2/2}$]-[Si((CH$_2$)$_3$SH)MeO$_{2/2}$]$_2$,
[HSi(OEt)MeO$_½$]$_2$[SiMe$_2$O$_{2/2}$]$_{134}$[Si(CH$_2$)$_4$CH = CH$_2$MeO$_{2/2}$]$_4$[Si((CH$_2$)$_6$SH)MeO$_{2/2}$]$_2$,
[HSi(OEt)MeO$_½$]$_2$[SiMe$_2$O$_{2/2}$]$_{120}$[SiMePhO$_{2/2}$]$_{24}$-[Si(CH$_2$)$_4$CH = CH$_2$MeO$_{2/2}$]$_4$[Si((CH$_2$)$_6$SH)MeO$_{2/2}$]$_2$,
[HSi(OEt)$_2$O$_½$]$_2$[SiMe$_2$O$_{2/2}$]$_{120}$[SiMe(CH$_2$)$_2$CF$_3$O$_{2/2}$]$_{15}$-[Si(CH$_2$)$_3$OC$_6$H$_4$OCH$_2$CH = CH$_2$MeO$_{2/2}$]$_4$-[Si((CH$_2$)$_6$SH)MeO$_{2/2}$]$_2$,
[HSi(OMe)MeO$_½$]$_2$[SiMe(CH$_2$)$_3$OCH$_2$CH(SH)CH$_2$-SHO$_{2/2}$]$_{11}$[SiMeVinylO$_{2/2}$]$_{55}$[SiMe$_2$O$_{2/2}$]$_{67}$,
[HSi(OEt)$_2$O$_½$]$_2$[SiMe$_2$O$_{2/2}$]$_{172}$[SiMe(CH$_2$)$_3$O(CH$_2$)$_3$-SHO$_{2/2}$]$_4$[SiMeO(CDD)O$_{2/2}$]$_{11}$ (CDD: 1-cyclododeca-4,8-dienyl radical),
[HSi(OEt)$_2$O$_½$]$_2$[SiMe$_2$O$_{2/2}$]$_{76}$[SiMe(CH$_2$)$_3$SHO$_{2/2}$]$_4$-[SiMeO(ECH)O$_{2/2}$]$_{11}$ (ECH: 2-(cyclohex-3-en-1-yl)-ethyl radical),
[HSi(OEt)$_2$O$_½$]$_2$[SiMe$_2$O$_{2/2}$]$_{121}$[Si(CH$_2$)$_3$OOCCH = CH$_2$MeO$_{2/2}$]$_1$[SiVinylMeO$_{2/2}$]$_4$[Si((CH$_2$)$_3$SH)MeO$_{2/2}$]$_2$,
[HSi(OEt)(OBu)O$_½$][HSi(OEt)$_2$O$_½$][SiMe$_2$O$_{2/2}$]$_{220}$-[SiMePhO$_{2/2}$]$_{44}$[SiCH$_2$CH = CH$_2$MeO$_{2/2}$]$_4$-[Si((CH$_2$)$_6$SH)MeO$_{2/2}$]$_2$,
[HSi(O$^i$Pr)$_2$O$_½$]$_4$[SiMeC$_2$H$_4$CF$_3$O$_{2/2}$]$_{144}$[Si(CH$_2$)$_3$OOCCH = CH$_2$O$_{3/2}$]$_2$,
[HSi(OEt)$_2$O$_½$]$_4$[SiMe$_2$O$_{2/2}$]$_{54}$[SiMeCH$_2$CH = CH$_2$O$_{2/2}$]$_{17}$[SiMe(CH$_2$)$_3$O(CH$_2$)$_3$SHO$_{2/2}$]$_3$[SiO$_{4/2}$],
[HSi(OEt)$_2$O$_½$]$_2$[SiMe$_2$O$_{2/2}$]$_{64}$[SiMe(-para-C$_6$H$_5$)SHO$_{2/2}$][SiMeC≡CHO$_{2/2}$]$_2$,
[HSi(OEt)$_2$O$_½$]$_2$[SiMe$_2$O$_{2/2}$]$_{120}$[SiMe(CH$_2$)$_2$CF$_3$O$_{2/2}$]$_{15}$-[Si(CH$_2$)$_3$OC$_6$H$_4$OCH$_2$CH = CH$_2$MeO$_{2/2}$]$_4$-[Si((CH$_2$)$_6$SH)MeO$_{2/2}$]$_2$,
[HSi(O$^n$Bu)$_2$O$_½$]$_2$[SiMe$_2$O$_{2/2}$]$_{344}$[SiMe(CH$_2$)$_4$CH = CH$_2$O$_{2/2}$]$_3$[SiMe(CH$_2$)$_3$OCH$_2$CH = CH$_2$O$_{2/2}$]$_2$-[SiMe(CH$_2$)$_3$SHO$_{2/2}$]$_8$,
[HSi(OEt)$_2$O$_½$]$_2$[SiMe$_2$O$_{2/2}$]$_{72}$[SiMe(CH$_2$)$_3$OOCCH$_2$-SHO$_{2/2}$]$_4$[SiMe(CH$_2$)$_6$OOCC(CH$_3$) = CH$_2$O$_{2/2}$]$_1$-[SiMeVinylO$_{2/2}$]$_5$,
[HSi(OEt)$_2$O$_½$]$_2$[SiMe$_2$O$_{2/2}$]$_{172}$[SiMe(CH$_2$)$_3$O(CH$_2$)$_3$-SHO$_{2/2}$]$_4$[SiMe(CH$_2$)$_3$OOCCH = CH$_2$O$_{2/2}$]$_{11}$,
[HSi(OEt)PhO$_½$]$_2$[SiMe$_2$O$_{2/2}$]$_{122}$[SiMe(CH$_2$)$_3$-SHO$_{2/2}$]$_2$[SiMe(CH$_2$)$_5$CH = CH(CH$_2$)$_3$CH = CH$_2$O$_{2/2}$]$_2$,
[HSi(OEt)$_2$O$_½$]$_2$[SiMe$_2$O$_{2/2}$]$_{178}$[SiMe(CH$_2$)$_3$OOCCH = CH$_2$O$_{2/2}$]$_{11}$,
[HSi(O$^n$C$_6$H$_{13}$)$_2$O$_½$]$_2$[SiMe$_2$O$_{2/2}$]$_{68}$[SiMe(CH$_2$)$_3$OOCCH = CH$_2$O$_{2/2}$]$_9$,
[HSi(OC$_2$H$_4$OC$_2$OCH$_3$)$_2$O$_½$]$_2$[SiMe$_2$O$_{2/2}$]$_{271}$-[SiMe(CH$_2$)$_3$SHO$_{2/2}$]$_{15}$[SiMe(CH$_2$)$_3$CH = CH$_2$O$_{2/2}$]$_{31}$,
[HSi(OC$_2$H$_4$OCH$_2$CH = CH$_2$)$_2$O$_½$]$_2$[SiMe$_2$O$_{2/2}$]$_{75}$-[SiMe(CH$_2$)$_5$CH = CH(CH$_2$)$_5$SHO$_{2/2}$]$_4$-[SiMeVinylO$_{2/2}$]$_8$ and
[HSi(OCH$_2$COOMe)$_2$O$_½$]$_2$[SiMe$_2$O$_{2/2}$]$_{175}$-[SiMe(CH$_2$)$_5$CH(SH)(CH$_2$)$_6$SHO$_{2/2}$]$_5$-[SiMeVinylO$_{2/2}$]$_8$, preferred compounds being
[HSi(OEt)$_2$O$_½$]$_2$[SiMe$_2$O$_{2/2}$]$_{65}$[SiVinylMeO$_{2/2}$]$_4$-[Si((CH$_2$)$_3$SH)MeO$_{2/2}$]$_2$,
[HSi(OEt)$_2$O$_½$]$_2$[SiMe$_2$O$_{2/2}$]$_{135}$[SiVinylMeO$_{2/2}$]$_4$-[Si((CH$_2$)$_3$SH)MeO$_{2/2}$]$_2$,
[HSi(OEt)$_2$O$_½$]$_2$[SiMe$_2$O$_{2/2}$]$_{334}$[SiVinylMeO$_{2/2}$]$_8$-[Si((CH$_2$)$_3$SH)MeO$_{2/2}$]$_7$,
[HSi(OEt)$_2$O$_½$]$_2$[SiMe$_2$O$_{2/2}$]$_{258}$[SiVinylMeO$_{2/2}$]$_6$-[Si((CH$_2$)$_3$SH)MeO$_{2/2}$]$_4$,

[HSi(OEt)MeO₁/₂]₂[SiMe₂O₂/₂]₆₅[SiVinylMeO₂/₂]-[Si((CH₂)₃SH)MeO₂/₂]₂,

[HSi(OEt)₂O₁/₂]₂[SiMe₂O₂/₂]₆₄[SiMeCH₂CH = CH₂O₂/₂]₇[SiMe(CH₂)₃OOC(CH₂)₂SHO₂/₂]₃,

[HSi(OEt)₂O₁/₂]₂[SiMe₂O₂/₂]₅₄₅[SiVinylMeO₂/₂]₆₇-[Si((CH₂)₃SH)MeO₂/₂]₃₃,

[HSi(OEt)₂O₁/₂]₃[SiMe₂O₂/₂]₂₅₈[SiVinylMeO₂/₂]₆-[Si((CH₂)₃SH)MeO₂/₂]₄[SiMeO₃/₂]₁,

[HSi(OMe)₂O₁/₂]₂[SiMe₂O₂/₂]₆₅[SiVinylMeO₂/₂]-[Si((CH₂)₃SH)MeO₂/₂]₂,

[HSi(OEt)MeO₁/₂]₂[SiMe₂O₂/₂]₁₃₄[Si(CH₂)₄CH = CH₂MeO₂/₂₄[Si((CH₂)₆SH)MeO₂/₂]₂,

[HSi(OEt)MeO₁/₂]₂[SiMe₂O₂/₂]₁₂₀[SiMePhO₂/₂]₂₄-[Si(CH₂)₄CH = CH₂MeO₂/₂]₄[Si((CH₂)₆SH-)MeO₂/₂]₂,

[HSi(OEt)₂O₁/₂]₂[SiMe₂O₂/₂]₁₂₀[SiMe(CH₂)₂CF₃O₂/₂]₁₅-[Si(CH₂)₃OC₆H₄OCH₂CH = CH₂MeO₂/₂]₄-[Si((CH₂)₆SH)MeO₂/₂]₂,

[HSi(OMe)MeO₁/₂]₂[SiMe(CH₂)₃OCH₂CH(SH)CH₂-SHO₂/₂]₁₁[SiMeVinylO₂/₂]₅₅[SiMe₂O₂/₂]₆₇,

[HSi(OEt)₂O₁/₂]₂[SiMe₂O₂/₂]₁₇₂[SiMe(CH₂)₃O(CH₂)₃-SHO₂/₂]₄[SiMeO(CDD)O₂/₂]₁₁

(CDD: 1-cyclododeca-4,8-dienyl radical) and

[HSi(OEt)₂O₁/₂]₂[SiMe₂O₂/₂]₇₆[SiMe(CH₂)₃SHO₂/₂]₄-[SiMeO(ECH)O₂/₂]₁₁

(ECH: 2-(cyclohex-3-en-1-yl)-ethyl radical) and particularly preferred compounds being

[HSi(OEt)₂O₁/₂]₂[SiMe₂O₂/₂]₆₅[SiVinylMeO₂/₂]₄-[Si((CH₂)₃SH)MeO₂/₂]₂,

[HSi(OEt)₂O₁/₂]₂[SiMe₂O₂/₂]₁₃₅[SiVinylMeO₂/₂]₄-[Si((CH₂)₃SH)MeO₂/₂]₂,

[HSi(OEt)₂O₁/₂]₂[SiMe₂O₂/₂]₃₃₄[SiVinylMeO₂/₂]₈-[Si((CH₂)₃SH)MeO₂/₂]₇,

[HSi(OEt)₂O₁/₂]₂[SiMe₂O₂/₂]₂₅₈[SiVinylMeO₂/₂]₆-[Si((CH₂)₃SH)MeO₂/₂]₄,

[HSi(OEt)MeO₁/₂]₂[SiMe₂O₂/₂]₆₅[SiVinylMeO₂/₂]-[Si((CH₂)₃SH)MeO₂/₂]₂ and

[HSi(OEt)₂O₁/₂]₂[SiMe₂O₂/₂]₆₄[SiMeCH₂CH = CH₂O₂/₂]₇[SiMe(CH₂)₃OOC(CH₂)₂SHO₂/₂]₃ wherein Me denotes the methyl radical, Et denotes the ethyl radical, Pr denotes the propyl radical, Bu denotes the butyl radical, Ph denotes the phenyl radical and vinyl denotes the vinyl radical.

The organo(poly)siloxanes according to the invention which contain siloxane units (A) and (B) preferably have a viscosity at 25° C. of 1 to 1×10⁶ mPa.s, particularly preferably 30 to 1×10⁵ mPa.s.

The organo(poly)siloxanes according to the invention which contain siloxane units (A) and (B) can be prepared by methods customary in silicon chemistry. According to these methods, for example, they can be prepared by reaction of organo(poly)siloxanes containing both at least one terminal hydroxyl group and at least one siloxane unit (B) with hydridoalkoxysilanes by the procedure described in the international application having the application number PCT/EP91/00795 (Wacker-Chemie GmbH, application date 25th Apr. 1991). The stoichiometry of the reaction participants is chosen here so that at least one siloxane unit (A) is present in the reaction product. The organo(poly)siloxanes containing both at least one terminal hydroxyl group and at least one siloxane unit (B) can be prepared, for example, by cohydrolysis of chloro-, acyloxy- or alkoxysilanes, preferably under a pressure of 900 to 1100 hPa and at a temperature of 20° to 180° C. Reference may be made here, for example, to W. Noll "Chemie und Technologie der Silicone (Chemistry and Technology of the Silicones)", Verlag Chemie Weinheim, 2nd edition, 1968, page 163 et seq.

The organo(poly)siloxane compositions according to the invention can contain, for example, organo(poly)siloxanes which contain siloxane units (A), siloxane units (B) and siloxane units (C).

The present invention thus furthermore relates to organo(poly)siloxanes which contain (A) units of the formula (I), (B) siloxane units which are crosslinkable by irradiation and (C) siloxane units which act as a photoinitiator.

The organo(poly)siloxanes according to the invention which contain siloxane units (A), (B) and (C) are preferably those which contain units of the formula (I), (II) and/or (III), (V) and (SiR₂O) units, where R has the abovementioned meaning.

The organo(poly)siloxanes according to the invention which contain siloxane units (A), (B) and (C) are particularly preferably those consisting of 0.5 to 10% of siloxane units of the formula (I), 0.5 to 20% of the siloxane units of the formula (II) and/or (III), 0.025 to 10% of siloxane units of the formula (V) and 60 to 99.975% of (SiR₂O) units where R has the abovementioned meaning, based on the total number of siloxane units in the molecule.

Examples of such organo(poly)siloxanes are

[HSi(OEt)₂O₁/₂][HSi(OEt)(OPI)O₁/₂][SiMe₂O₂/₂]₉₄-[SiMeCH₂CH = CH₂O₂/₂]₅[SiMe(CH₂)₃OOC(CH₂)₂SHO₂/₂]₃ OPI: 2-methyl-1-phenyl-1-propanon-2-oxy,

[HSi(OPI)₂O₁/₂]₀.₅[HSi(OMe)(OPI)O₁/₂]₀.₅[HSi-(OEt)₂O₁/₂][SiMe₂O₂/₂]₁₆₈[SivinylMeO₂/₂]₁₆-[Si((CH₂)₃SH)MeO₂/₂]₈ OPI: 1-hydroxycyclohexyl phenyl ketone,

[HSi(OPI)(OEt)O₁/₂][HSi(OEt)₂O₁/₂][SiMe₂O₂/₂]₆₅-[SivinylMeO₂/₂][Si((CH₂)₃SH)MeO₂/₂]₂ OPI: 2-methyl-1-phenyl-1-propanon-2-oxy,

[HSi(OPI)(OEt)O₁/₂]₁[HSi(OEt)₂O₁/₂]₃[SiMe₂O₂/₂]₈₈-[SivinylMeO₂/₂]₅[Si((CH₂)₃SH)MeO₂/₂]₂ OPI: 1-hydroxycyclohexyl) phenyl ketone,

[HSi(OPI)(OEt)O₁/₂][HSi(OEt)₂O₁/₂][SiMe₂O₂/₂]₆₅-[SivinylMeO₂/₂]₃[Si((CH₂)₃SH)MeO₂/₂]₂ OPI: 2-ethyl-1-phenyl-1-hexanon-2-oxy,

[HSi(OMe)MeO₁/₂][HSi(OPI)MeO₁/₂][SiMe(CH₂-)₃OCH₂CH(SH)CH₂SHO₂/₂]₁₁[SiMevinylO₂/₂]₅₅-[SiMe₂O₂/₂]₆₇ OPI: 2-methyl-1-phenyl-1-propanon-2-oxy,

[HSi(OMe)(OPI)O₁/₂][HSi(OEt)₂O₁/₂][SiMe₂O₂/₂]₆₅-[SivinylMeO₂/₂]₄[Si((CH₂)₃SH)MeO₂/₂]₂ OPI: 1-(3,4-dimethylphenyl)-2-methyl-1-propanon-2-oxy,

[HSi(OEt)MeO₁/₂][HSi(OPI)MeO₁/₂][SiMe₂O₂/₂]₁₂₀-[SiMePhO₂/₂]₂₄[Si(CH₂)₄CH = CH₂MeO₂/₂]₄-[Si((CH₂)₆SH)MeO₂/₂]₂ OPI: 1-hydroxy-3,4-dimethyl-3-cyclohexen-1-yl phenyl ketone,

[HSi(OMe)₂O₁/₂][HSi(OMe)(OPI)O₁/₂][SiMe₂O₂/₂]₆₅-[SivinylMeO₂/₂][Si((CH₂)₃SH)MeO₂/₂]₂ OPI: 2-ethyl-1-(4-tolyl)-1-hexanon-2-oxy,

[HSi(OEt)₂O₁/₂]₃[HSi(OEt)(OPI)O₁/₂][SiMe₂O₂/₂]₇₇-[SiMeCH₂CH = CH₂O₂/₂]₇[SiMe(CH₂)₃O(CH₂)₃-SHO₂/₂]₂[SiO₄/₂] OPI: 2-ethyl-1-(4-methoxyphenyl)-1-hexanon-2-oxy,

[HSi(OEt)₂O₁/₂][HSi(OEt)(OPI)O₁/₂][SiMe₂O₂/₂]₁₂₁-[Si(CH₂)₃OOCCH = CH₂MeO₂/₂]₁[Sivinyl-MeO₂/₂]₄[Si((CH₂)₃SH)MeO₂/₂]₂ OPI: 1-(3,4-dimethylphenyl)-2-methyl-1-propanon-2-oxy,

[HSi(OMe)(OBu)O₁/₂][HSiPh(OPI)O₁/₂][SiMe₂O₂/₂]₁₂₀-[SiMePhO₂/₂]₄₄[SiCH₂CH = CH₂MeO₂/₂]₄-

[Si((CH$_2$)$_4$SH)MeO$_{2/2}$]$_2$ OPI: 1-hydroxy-4-methyl-3-cyclohexen-1-yl phenyl ketone,

[HSi(O$^n$Bu)$_2$O$_{\frac{1}{2}}$][HSiMe(OPI)O$_{\frac{1}{2}}$][SiMe$_2$O$_{2/2}$]$_{234}$-[SiMe(CH$_2$)$_4$CH = CH$_2$O$_{2/2}$]$_3$[SiMe(CH$_2$)$_3$OCH$_2$CH = CH$_2$O$_{2/2}$]$_{22}$[SiMe(CH$_2$)$_3$SHO$_{2/2}$]$_{18}$ OPI: methyl 4-methyl-5-phenyl-5-oxo-pentanoate-4-oxy,

[HSi(O$^n$Pr)$_2$O$_{\frac{1}{2}}$][HSi(O$^n$Pr)(OPI)O$_{\frac{1}{2}}$][SiMe$_2$O$_{2/2}$]$_{158}$-[SiMe(CH$_2$)$_3$OOCCH = CH$_2$O$_{2/2}$]$_{11}$ OPI: 1-(4-fluorophenyl)-2-methyl-1-propanon-2-oxy,

[HSi(OPI)(OEt)O$_{\frac{1}{2}}$][HSi(O$^n$Bu)$_2$O$_{\frac{1}{2}}$][SiMe$_2$O$_{2/2}$]$_{85}$-[SivinylMeO$_{2/2}$]$_5$[Si((CH$_2$)$_3$SH)MeO$_{2/2}$]$_2$ OPI: 1-(4-methoxyphenyl)-2-methyl-1-propanon-2-oxy and

[HSi(OPI)$_2$O$_{\frac{1}{2}}$]$_{\frac{1}{3}}$[HSi(O$^i$Pr)$_2$O$_{\frac{1}{2}}$]$_{\frac{2}{3}}$[SiMeC$_2$H$_4$CF$_3$O$_{2/2}$]$_{274}$[Si(CH$_2$)$_3$OOCCH = CH$_2$O$_{3/2}$] OPI: 2-methyl-1-(4-methophenyl)-1-propanon-2-oxy, preferred compounds being [HSi(OEt)$_2$O$_{\frac{1}{2}}$][HSi(OEt)(OPI)O$_{\frac{1}{2}}$][SiMe$_2$O$_{2/2}$]$_{94}$[SiMeCH$_2$CH = CH$_2$O$_{2/2}$]$_5$-[SiMe(CH$_2$)$_3$OOC(CH$_2$)$_2$SHO$_{2/2}$]$_3$ OPI: 2-methyl-1-phenyl-1-propanon-2-oxy,

[HSi(OPI)$_2$O$_{\frac{1}{2}}$]$_{0.5}$[HSi(OMe)(OPI)O$_{\frac{1}{2}}$]$_{0.5}$[HSi(OEt)$_2$O$_{\frac{1}{2}}$][SiMe$_2$O$_{2/2}$]$_{168}$[SivinylMeO$_{2/2}$]$_{16}$-[Si((CH$_2$)$_3$SH)MeO$_{2/2}$]$_8$ OPI: 1-hydroxycyclohexyl phenyl ketone,

[HSi(OPI)(OEt)O$_{\frac{1}{2}}$][HSi(OEt)$_2$O$_{\frac{1}{2}}$][SiMe$_2$O$_{2/2}$]$_{65}$-[SivinylMeO$_{2/2}$][Si((CH$_2$)$_3$SH)MeO$_{2/2}$]$_2$ OPI: 2-methyl-1-phenyl-1-propanon-2-oxy,

[HSi(OPI)(OEt)O$_{\frac{1}{2}}$]$_{\frac{1}{3}}$[HSi(OEt)$_2$O$_{\frac{1}{2}}$]$_{\frac{2}{3}}$[SiMe$_2$O$_{2/2}$]$_{88}$-[SivinylMeO$_{2/2}$]$_5$[Si((CH$_2$)$_3$SH)MeO$_{2/2}$]$_2$ OPI: 1-hydroxycyclohexyl phenyl ketone,

[HSi(OPI)(OEt)O$_{\frac{1}{2}}$][HSi(OEt)$_2$O$_{\frac{1}{2}}$][SiMe$_2$O$_{2/2}$]$_{65}$-[SivinylMeO$_{2/2}$]$_3$[Si((CH$_2$)$_3$SH)MeO$_{2/2}$]$_2$ OPI: 2-ethyl-1-phenyl-1-hexanon-2-oxy,

[HSi(OMe)MeO$_{\frac{1}{2}}$][HSi(OPI)MeO$_{\frac{1}{2}}$][SiMe(CH$_2$)$_3$OCH$_2$CH(SH)CH$_2$SHO$_{2/2}$]$_{11}$[SiMevinylO$_{2/2}$]$_{55}$-[SiMe$_2$O$_{2/2}$]$_{67}$ OPI: 2-methyl-1-phenyl-1-propanon-2-oxy,

[HSi(OMe)(OPI)O$_{\frac{1}{2}}$][HSi(OEt)$_2$O$_{\frac{1}{2}}$][SiMe$_2$O$_{2/2}$]$_{65}$-[SivinylMeO$_{2/2}$]$_4$[Si((CH$_2$)$_3$SH)MeO$_{2/2}$]$_2$ OPI: 1-(3,4-dimethylphenyl)-2-methyl-1-propanon-2-oxy,

[HSi(OEt)MeO$_{\frac{1}{2}}$][HSi(OPI)MeO$_{\frac{1}{2}}$][SiMe$_2$O$_{2/2}$]$_{120}$-[SiMePhO$_{2/2}$]$_{24}$[Si(CH$_2$)$_4$CH = CH$_2$MeO$_{2/2}$]$_4$-[Si((CH$_2$)$_6$SH)MeO$_{2/2}$]$_2$ OPI: 1-hydroxy-3,4-dimethyl-3-cyclohexen-1-yl phenyl ketone and

[HSi(OMe)$_2$O$_{\frac{1}{2}}$][HSi(OMe)(OPI)O$_{\frac{1}{2}}$][SiMe$_2$O$_{2/2}$]$_{65}$-[SivinylMeO$_{2/2}$][Si((CH$_2$)$_3$SH)MeO$_{2/2}$]$_2$ OPI: 2-ethyl-1-(4-tolyl)-1-hexanon-2-oxy and particularly preferred compounds being [HSi(OEt)$_2$O$_{\frac{1}{2}}$][HSi(OEt)(OPI)O$_{\frac{1}{2}}$][SiMe$_2$O$_{2/2}$]$_{94}$[SiMeCH$_2$CH = CH$_2$O$_{2/2}$]$_5$[SiMe(CH$_2$)$_3$OOC(CH$_2$)$_2$SHO$_{2/2}$]$_3$ OPI: 2-methyl-1-phenyl-1-propanon-2-oxy,

[HSi(OPI)$_2$O$_{\frac{1}{2}}$]$_{0.5}$[HSi(OMe)(OPI)O$_{\frac{1}{2}}$]$_{0.5}$[HSi(OEt)$_2$O$_{\frac{1}{2}}$][SiMe$_2$O$_{2/2}$]$_{168}$[SivinylMeO$_{2/2}$]$_{16}$-[Si((CH$_2$)$_3$SH)MeO$_{2/2}$]$_8$ OPI: 1-hydroxycyclohexyl phenyl ketone,

[HSi(OPI)(OEt)O$_{\frac{1}{2}}$][HSi(OEt)$_2$O$_{\frac{1}{2}}$][SiMe$_2$O$_{2/2}$]$_{65}$-[SivinylMeO$_{2/2}$9 [Si((CH$_2$)$_3$SH)MeO$_{2/2}$]$_2$ OPI: 2-methyl-1-phenyl-1-propanon-2-oxy,

[HSi(OPI)(OEt)O$_{\frac{1}{2}}$]$_{\frac{1}{3}}$[HSi(OEt)$_2$O$_{\frac{1}{2}}$]$_{\frac{2}{3}}$[SiMe$_2$O$_{2/2}$]$_{88}$-[SivinylMeO$_{2/2}$]$_5$[Si((CH$_2$)$_3$SH)MeO$_{2/2}$]$_2$ OPI: 1-hydroxycyclohexyl phenyl ketone and

[HSi(OPI)(OEt)O$_{\frac{1}{2}}$][HSi(OEt)$_2$O$_{\frac{1}{2}}$][SiMe$_2$O$_{2/2}$]$_{65}$-[SivinylMeO$_{2/2}$]$_3$[Si((CH$_2$)$_3$SH)MeO$_{2/2}$]$_2$ OPI: 2-ethyl-1-phenyl-1-hexanon-2-oxy wherein Me denotes the methyl radical, Et denotes the ethyl radical, Pr denotes the propyl radical, Bu denotes the butyl radical, Ph denotes the phenyl radical and vinyl denotes the vinyl radical.

The organo(poly)siloxanes according to the invention which contain siloxane units (A), (B) and (C) preferably have a viscosity at 25° C. of 1 to $1 \times 10^6$ mPa.s, particularly preferably 30 to $1 \times 10^5$ mPa.s.

The organo(poly)siloxanes according to the invention which contain siloxane units (A), (B) and (C) can be prepared by methods customary in silicon chemistry. They are prepared, for example, by reaction of siloxanes containing siloxane units (A) and (B) with photoinitiators containing at least one hydroxyl group, such as, for example, 2-hydroxy-2-methyl-1-phenylpropane, 1-benzoylcyclohexan-1-ol and m-hydroxybenzil, by a procedure described in W. Noll "Chemie and Technologie der Silicone (Chemistry and Technology of the Silicones)", Verlag Chemie Weinheim, 2nd edition, 1968, page 556, the alcohol formed during the reaction being removed by distillation under the pressure of the surrounding atmosphere or increased pressure (up to $10^5$ hPa) or reduced pressure (up to $10^{-6}$ hPa) and at a temperature of 20° to 220° C., preferably under a pressure of 900 to 1100 hPa and at a temperature of 30° to 180° C. The stoichiometry of the reaction partners must of course be chosen so that at least one siloxane unit (A) is present in the reaction product. Photoinitiators which contain at least one hydroxyl group and can furthermore be employed are all the compounds mentioned in DE 2759766 (Merck Patent GmbH; published on 14th Apr. 1989).

For example, the organo(poly)siloxane compositions according to the invention can contain organo(poly)siloxanes which contain both siloxane units (A) and siloxane units (C), and organo(poly)siloxanes which contain siloxane units (B).

The present invention thus furthermore relates to organo(poly)siloxanes which contain
(A) units of the formula (I) and
(C) siloxane units which act as a photoinitiator.

The organo(poly)siloxanes according to the invention which contain siloxane units (A) and (C) are preferably those which contain units of the formulae (I) and (V) and (SiR$_2$O) units where R has the abovementioned meaning.

The organo(poly)siloxanes according to the invention which contain siloxane units (A) and (C) are particularly preferably those consisting of 0.5 to 10% of siloxane units of the formula (I), 0.01 to 10% of the siloxane units of the formula (V) and 20 to 99.49% of (SiR$_2$O) units where R has the abovementioned meaning, based on the total number of siloxane units in the molecule.

Examples of such organo(poly)siloxanes are
[HSi(OPI)(OEt)O$_{\frac{1}{2}}$][HSi(OEt)$_2$O$_{\frac{1}{2}}$][SiMe$_2$O$_{2/2}$]$_{65}$ OPI: 2-methyl-1-phenyl-1-propanon-2-oxy,

[HSi(OPI)(OEt)O$_{\frac{1}{2}}$]$_{\frac{1}{3}}$[HSi(OEt)$_2$O$_{\frac{1}{2}}$]$_{\frac{2}{3}}$[SiMe$_2$O$_{2/2}$]$_{88}$ OPI: 1-hydroxycyclohexyl phenyl ketone,

[HSi(OPI)(OEt)O$_{\frac{1}{2}}$][HSi(OEt)$_2$O$_{\frac{1}{2}}$][SiMe$_2$O$_{2/2}$]$_{65}$ OPI: 2-ethyl-1-phenyl-1-hexanon-2-oxy,

[HSi(OEt)MeO$_{\frac{1}{2}}$][HSiMe(OPI)O$_{\frac{1}{2}}$][SiMe$_2$O$_{2/2}$]$_{84}$ OPI: 2-methyl-1-phenyl-1-propanon-2-oxy,

[HSi(OPI)$_2$O$_{\frac{1}{2}}$]$_{0.5}$[HSi(OMe)O$_{2/2}$]$_{0.5}$[HSi(OEt)$_2$O$_{\frac{1}{2}}$]-[SiMe$_2$O$_{2/2}$9 168 OPI: 1-hydroxycyclohexyl phenyl ketone,

[HSi(OMe)(OPI)O$_{\frac{1}{2}}$][HSi(OEt)$_2$O$_{\frac{1}{2}}$][SiMe$_2$O$_{2/2}$]$_{115}$ OPI: 1-(3,4-dimethylphenyl)-2-methyl-1-propanon-2-oxy,

[HSi(OEt)MeO$_{\frac{1}{2}}$][HSi(OPI)MeO$_{\frac{1}{2}}$][SiMe$_2$O$_{2/2}$]$_{120}$-[SiMePhO$_{2/2}$]$_{24}$ OPI: 1-hydroxy-3,4-dimethyl-3-cyclohexen-1-yl phenyl ketone,

[HSi(OMe)$_2$O$_{\frac{1}{2}}$][HSi(OMe)(OPI)O$_{\frac{1}{2}}$][SiMe$_2$O$_{2/2}$]$_{65}$ OPI: 2-ethyl-1-(4-tolyl)-1-hexanon-2-oxy,

[HSi(OMe)MeO$_{\frac{1}{2}}$][HSi(OPI)MeO$_{\frac{1}{2}}$][SiMe$_2$O$_{2/2}$]$_{67}$ OPI: 2-methyl-1-phenyl-1-propanon-2-oxy,

[HSi(OPI)(OEt)O$_{\frac{1}{2}}$][HSi(O$^n$Bu)$_2$O$_{\frac{1}{2}}$][SiMe$_2$O$_{2/2}$]$_{85}$ OPI: 1-(4-methoxyphenyl)-2-methyl-1-propanon-2-oxy,

[HSi(OPI)$_2$O$_{\frac{1}{2}}$]$_{\frac{1}{3}}$[HSi(O$^i$Pr)$_2$O$_{\frac{1}{2}}$]$_{\frac{1}{3}}$[SiMeC$_2$H$_4$CF$_3$O$_{2/2}$]$_{274}$ OPI: 2-methyl-1-(4-methoxyphenyl)-1-propanon-2-oxy,

[HSi(OEt)$_2$O$_{\frac{1}{2}}$]$_3$[HSi(OEt)(OPI)O$_{\frac{1}{2}}$][SiMe$_2$O$_{2/2}$]$_{74}$[SiO$_{4/2}$] OPI: 2-ethyl-1-(4-methoxyphenyl)-1-hexanon-2-oxy,

[HSi(OEt)$_2$O$_{\frac{1}{2}}$][HSi(OEt)(OPI)O$_{\frac{1}{2}}$][SiMe$_2$O$_{2/2}$]$_{11}$ OPI: 1-(3,4-dimethylphenyl)-2-methyl-1-propanon-2-oxy,

[HSi(OMe)(O$^n$Bu)O$_{\frac{1}{2}}$][HSiPh(OPI)O$_{\frac{1}{2}}$][SiMe$_2$O$_{2/2}$]$_{120}$[SiMePhO$_{2/2}$]$_{14}$ OPI: 1-hydroxy-4-methyl-3-cyclohexen-1-yl phenyl ketone,

[HSi(O$^n$Bu)$_2$O$_{\frac{1}{2}}$][HSiMe(OPI)O$_{\frac{1}{2}}$][SiMe$_2$O$_{2/2}$]$_{344}$ OPI: methyl 4-methyl-5-phenyl-5-oxo-pentanoate-4-oxy and [HSi(O$^n$Pr)$_2$O$_{\frac{1}{2}}$][HSiMe(O$^n$Pr(OPI))O$_{\frac{1}{2}}$][SiMe$_2$O$_{2/2}$]$_{15}$ OPI: 1-(4-fluorophenyl)-2-methyl-1-propanon-2-oxy, preferred compounds being [HSi(OPI)(OEt)O$_{\frac{1}{2}}$][HSi(OEt)$_2$O$_{\frac{1}{2}}$][SiMe$_2$O$_{2/2}$]$_{65}$ OPI: 2-methyl-1-phenyl-1-propanon-2-oxy,

[HSi(OPI)(OEt)O$_{\frac{1}{2}}$]$_{\frac{1}{3}}$[HSi(OEt)$_2$O$_{\frac{1}{2}}$]$_{\frac{2}{3}}$[SiMe$_2$O$_{2/2}$]$_{88}$ OPI: 1-hydroxycyclohexyl phenyl ketone,

[HSi(OPI)(OEt)O$_{\frac{1}{2}}$][HSi(OEt)$_2$O$_{\frac{1}{2}}$][SiMe$_2$O$_{2/2}$]$_{65}$ OPI: 2-ethyl-1-phenyl-1-hexanon-2-oxy,

[HSi(OEt)MeO$_{\frac{1}{2}}$][HSiMe(OPI)O$_{\frac{1}{2}}$][SiMe$_2$O$_{2/2}$]$_{84}$ OPI: 2-methyl-1-phenyl-1-propanon-2-oxy,

[[HSi(OPI)$_2$O$_{\frac{1}{2}}$]$_{0.5}$[HSi(OMe)O$_{\frac{1}{2}}$]$_{0.5}$[HSi(OEt)$_2$O$_{\frac{1}{2}}$][SiMe$_2$O$_{2/2}$]$_{168}$ OPI: 1-hydroxycyclohexyl phenyl ketone,

[HSi(OMe)(OPI)O$_{\frac{1}{2}}$][HSi(OEt)$_2$O$_{\frac{1}{2}}$][SiMe$_2$O$_{2/2}$]$_{115}$ OPI: 1-(3,4-dimethylphenyl)-2-methyl-1-propanon-2-oxy,

[HSi(OEt)MeO$_{\frac{1}{2}}$][HSi(OPI)MeO$_{\frac{1}{2}}$][SiMe$_2$O$_{2/2}$]$_{120}$[SiMePhO$_{2/2}$]$_{24}$ OPI: 1-hydroxy-3,4-dimethyl-3-cyclohexen-1-yl phenyl ketone,

[HSi(OMe)$_2$O$_{\frac{1}{2}}$][HSi(OMe)(OPI)O$_{\frac{1}{2}}$][SiMe$_2$O$_{2/2}$]$_{65}$ OPI: 2-ethyl-1-(4-tolyl)-1-hexanon-2-oxy and

[HSi(OMe)MeO$_{\frac{1}{2}}$][HSi(OPI)MeO$_{\frac{1}{2}}$][SiMe$_2$O$_{2/2}$]$_{67}$ OPI: 2-methyl-1-phenyl-1-propanon-2-oxy and particularly preferred compounds being

[HSi(OPI)(OEt)O$_{\frac{1}{2}}$][HSi(OEt)$_2$O$_{\frac{1}{2}}$][SiMe$_2$O$_{2/2}$]$_{65}$ OPI: 2-methyl-1-phenyl-1-propanon-2-oxy,

[HSi(OPI)(OEt)O$_{\frac{1}{2}}$]$_{\frac{1}{3}}$[HSi(OEt)$_2$O$_{\frac{1}{2}}$]$_{\frac{2}{3}}$[SiMe$_2$O$_{2/2}$]$_{88}$ OPI: 1-hydroxycyclohexyl phenyl ketone,

[HSi(OPI)(OEt)O$_{\frac{1}{2}}$.9 [HSi(OEt)$_2$O$_{\frac{1}{2}}$][SiMe$_2$O$_{2/2}$]$_{65}$ OPI: 2-ethyl-1-phenyl-1-hexanon-2-oxy,

[HSi(OEt)MeO$_{\frac{1}{2}}$][HSiMe(OPI)O$_{\frac{1}{2}}$][SiMe$_2$O$_{2/2}$]$_{84}$ OPI: 2-methyl-1-phenyl-1-propanon-2-oxy and

[[HSi(OPI$_2$O$_{\frac{1}{2}}$]$_{0.5}$[HSi(OMe)O$_{\frac{1}{2}}$]$_{0.5}$[HSi(OEt)$_2$O$_{\frac{1}{2}}$][SiMe$_2$O$_{2/2}$]$_{168}$ OPI: 1-hydroxycyclohexyl phenyl ketone and wherein Me denotes the methyl radical, Et denotes the ethyl radical, Pr denotes the propyl radical, Bu denotes the butyl radical and Ph denotes the phenyl radical.

The organo(poly)siloxanes according to the invention which contain siloxane units (A) and (C) preferably have a viscosity at 25° C. of 1 to 1×10$^6$ mPa.s, particularly preferably 30 to 1×10$^5$ mPa.s.

The organo(poly)siloxanes according to the invention which contain siloxane units (A) and (C) can be prepared by methods which are customary in silicon chemistry. They are prepared, for example, by reaction of siloxanes containing siloxane units (A) with photoinitiators containing at least one hydroxyl group, such as, for example, 2-hydroxy-2-methyl-1-phenylpropane, 1-benzoylcyclohexan-1-ol and m-hydroxybenzil, by a procedure described in W. Noll "Chemie und Technologie der Silicone (Chemistry and Technology of the Silicones)", Verlag Chemie Weinheim, 2nd edition, 1968, page 556, the alcohol formed during the reaction being removed by distillation under the pressure of the surrounding atmosphere or increased pressure (up to 10$^5$ hPa) or reduced pressure (up to 10$^{-6}$ hPa) and at a temperature of 20° to 220° C., preferably under a pressure of 900 to 1100 hPa and at a temperature of 30° to 180° C. The stoichiometry of the reaction partners must of course be chosen so that at least one siloxane unit (A) is still present in the reaction product. Photoinitiators containing at least one hydroxyl group which can furthermore be employed are all the compounds mentioned in DE 2759766 (Merck Patent GmbH; published on 14th Apr. 1989).

The organo(poly)siloxanes according to the invention which contain siloxane units (A) and (C) have the advantage that on the one hand they are very readily miscible with organo(poly)siloxanes, and on the other hand the storage stability of the organo(poly)siloxane composition according to the invention is increased by blocking of the hydroxyl group of the photoinitiator.

The organo(poly)siloxane compositions according to the invention can contain, for example, organo(poly)siloxanes which contain both siloxane units (B) and siloxane units (C), and organo(poly)siloxanes which contain siloxane units (A).

The organo(poly)siloxanes according to the invention which contain siloxane units (B) and (C) are preferably those which contain units of the formulae (V), (II) and/or (III) and (SiR$_2$O) units where R has the abovementioned meaning.

The organo(poly)siloxanes according to the invention which contain siloxane units (B) and (C) are particularly preferably those consisting of 0.025 to 10% of siloxane units of the formula (V), 0.5 to 20% of the siloxane units of the formula (II) and/or (III) and 70 to 99.475% of (SiR$_2$O) units where R has the abovementioned meaning, based on the total number of siloxane units in the molecule.

Examples of such organo(poly)siloxanes are
[HSi(OPI)(OEt)O$_{\frac{1}{2}}$]$_2$ [SiMe$_2$O$_{2/2}$]$_{65}$[SivinylMeO$_{2/2}$]$_4$[Si((CH$_2$)$_3$SH)MeO$_{2/2}$]$_2$ OPI: 2-methyl-1-phenyl-1-propanon-2-oxy,

[HSi(OPI)$_2$O$_{\frac{1}{2}}$]$_2$[SiMe$_2$O$_{2/2}$]$_{65}$[SivinylMeO$_{2/2}$]$_4$[Si((CH$_2$)$_3$SH)MeO$_{2/2}$]$_2$ OPI: 2-methyl-1-phenyl-1-propanon-2-oxy,

[HSi(OPI)(OEt)O$_{\frac{1}{2}}$]$_2$[SiMe$_2$O$_{2/2}$]$_{65}$[SivinylMeO$_{2/2}$]$_5$[Si((CH$_2$)$_3$SH)MeO$_{2/2}$]$_2$ OPI: 1-hydroxycyclohexyl phenyl ketone,

[HSi(OPI)$_2$O$_{\frac{1}{2}}$]$_2$[SiMe$_2$O$_{2/2}$]$_{65}$[SivinylMeO$_{2/2}$]$_5$[Si((CH$_2$)$_3$SH)MeO$_{2/2}$]$_2$ OPI: 1-hydroxycyclohexyl phenyl ketone,

[HSi(OMe)(OPI)O$_{\frac{1}{2}}$]$_2$[SiMe$_2$O$_{2/2}$]$_{65}$[SivinylMeO$_{2/2}$]$_4$[Si((CH$_2$)$_3$SH)MeO$_{2/2}$]$_2$ OPI: 2-methyl-1-phenyl-1-propanon-2-oxy,

[HSi(OPI)$_2$O$_{\frac{1}{2}}$][HSi(OMe)(OPI)O$_{\frac{1}{2}}$][SiMe$_2$O$_{2/2}$]$_{68}$[SivinylMeO$_{2/2}$]$_6$[Si((CH$_2$)$_3$SH)MeO$_{2/2}$]$_4$ OPI: 1-hydroxycyclohexyl phenyl ketone,

[HSi(OPI)$_2$O$_{\frac{1}{2}}$][HSi(OMe)(OPI)O$_{\frac{1}{2}}$][SiMe$_2$O$_{2/2}$]$_{68}$[SivinylMeO$_{2/2}$]$_6$[Si((CH$_2$)$_3$SH)MeO$_{2/2}$]$_4$ OPI: 2-methyl-1-phenyl-1-propanon-2-oxy,

[HSi(OMe)(OPI)O$_{1/2}$]$_2$[SiMe$_2$O$_{2/2}$]$_{65}$[SivinylMeO$_{2/2}$]$_4$-[Si((CH$_2$)$_3$SH)MeO$_{2/2}$]$_2$ OPI: 1-hydroxycyclohexyl phenyl ketone,

[HSi(OPI)MeO$_{1/2}$]$_2$[SiMe$_2$O$_{2/2}$]$_{112}$[Si(CH$_2$)$_4$CH = CH$_2$MeO$_{2/2}$]$_4$[Si((CH$_2$)$_6$SH)MeO$_{2/2}$]$_2$ OPI: 2-methyl-1-phenyl-1-propanon-2-oxy,

[HSi(OMe)(OPI)O$_{1/2}$]$_2$[SiMe$_2$O$_{2/2}$]$_{65}$[SivinylMeO$_{2/2}$]$_4$-[Si((CH$_2$)$_3$SH)MeO$_{2/2}$]$_2$ OPI: 1-(3,4-dimethylphenyl)-2-methyl-1-propanon-2-oxy,

[HSi(OPI)MeO$_{1/2}$]$_2$[SiMe(CH$_2$)$_3$OCH$_2$CH(SH)CH$_2$SHO$_{2/2}$]$_{11}$[SiMevinylO$_{2/2}$]$_{35}$[SiMe$_2$O$_{2/2}$]$_{67}$ OPI: 2-methyl-1-phenyl-1-propon-2-oxy,

[HSi(OEt)(OPI)O$_{1/2}$]$_2$[SiMe$_2$O$_{2/2}$]$_{94}$[SiMeCH$_2$CH = CH$_2$O$_{2/2}$]$_5$[SiMe(CH$_2$)$_3$OOC(CH$_2$)$_2$SHO$_{2/2}$]$_3$ OPI: 2-methyl-1-phenyl-1-propanon-2-oxy,

[HSi(OPI)(OEt)O$_{1/2}$]$_2$[SiMe$_2$O$_{2/2}$]$_{85}$[SivinylMeO$_{2/2}$]$_5$-[Si((CH$_2$)$_3$SH)MeO$_{2/2}$]$_2$ OPI: 1-(4-methoxyphenyl)-2-methyl-1-propanon-2-oxy,

[HSi(OPI)(OEt)O$_{1/2}$]$_2$[SiMe$_2$O$_{2/2}$]$_{165}$[SivinylMeO$_{2/2}$]$_{13}$-[Si((CH$_2$)$_3$SH)MeO$_{2/2}$]$_{12}$ OPI: 2-ethyl-1-phenyl-1-hexanon-2-oxy,

[HSiPh(OPI)O$_{1/2}$]$_2$[SiMe$_2$O$_{2/2}$]$_{120}$[SiMePhO$_{2/2}$]$_{14}$-[SiCH$_2$CH = CH$_2$MeO$_{2/2}$]$_4$[Si((CH$_2$)$_4$SH)MeO$_{2/2}$]$_2$ OPI: 1-hydroxy-4-methyl-3-cyclohexen-1-yl phenyl ketone,

[HSiMe(OPI)O$_{1/2}$]$_2$[SiMe$_2$O$_{2/2}$]$_{234}$[SiMe(CH$_2$)$_4$CH = CH$_2$O$_{2/2}$]$_3$[SiMe(CH$_2$)$_3$OCH$_2$CH = CH$_2$O$_{2/2}$]$_{22}$-[SiMe(CH$_2$)$_3$SHO$_{2/2}$]$_{18}$ OPI: methyl 4-methyl-5-phenyl-5-oxo-pentanoate 4-oxy,

[HSi(OPI)PhO$_{1/2}$]$_2$[SiMe(CH$_2$)$_3$OCH$_2$CH(SH)CH$_2$SHO$_{2/2}$]$_{11}$[SiMe(CH$_2$)$_5$CH = CH(CH$_2$)$_3$CH = CH$_2$O$_{2/2}$]$_5$[SiMe$_2$O$_{2/2}$]$_{67}$ OPI: 2-methyl-1-phenyl-1-propanon-2-oxy,

[HSi(O$^n$Pr)(OPI)O$_{1/2}$]$_2$[SiMe$_2$O$_{2/2}$]$_{58}$[SiMe(CH$_2$)$_3$OOCCH = CH$_2$O$_{2/2}$]$_9$ OPI: 1-(4-fluorophenyl)-2-methyl-1-propanon-2-oxy,

[HSi(OPI)O$_{1/2}$]$_2$[SiMe$_2$O$_{2/2}$]$_{58}$[SiMe(CH$_2$)$_3$OOCCH = CH$_2$O$_{2/2}$]$_9$ OPI: 2-methyl-1-phenyl-1-propanon-2-oxy,

[HSi(OPI)(OMe)O$_{1/2}$]$_3$[SiMeC$_2$H$_4$CF$_3$O$_{2/2}$]$_{174}$[Si(CH$_2$)$_3$OOCCH = CH$_2$O$_{3/2}$] OPI: 2-methyl-1-(4-methoxyphenyl)-1-propanon-2-oxy,

[HSi(OPI)MeO$_{1/2}$]$_2$[SiMe$_2$O$_{2/2}$]$_{120}$[SiMePhO$_{2/2}$]$_{24}$-[Si(CH$_2$)$_4$CH = CH$_2$MeO$_{2/2}$]$_4$[Si((CH$_2$)$_6$SH)MeO$_{2/2}$]$_2$ OPI: 1-hydroxy-3,4-dimethyl-3-cyclohexen-1-yl phenyl ketone,

[HSi(OMe)(OPI)O$_{1/2}$]$_2$[SiMe$_2$O$_{2/2}$]$_{65}$[SivinylMeO$_{2/2}$]-[Si((CH$_2$)$_3$SH)MeO$_{2/2}$]$_2$ OPI: 2-ethyl-1-(4-tolyl)-1-hexanon-2-oxy,

[HSi(OEt)(OPI)O$_{1/2}$]$_4$[SiMe$_2$O$_{2/2}$]$_{77}$[SiMeCH$_2$CH = CH$_2$O$_{2/2}$]$_7$[SiMe(CH$_2$)$_3$O(CH$_2$)$_3$SHO$_{2/2}$]$_2$[SiO$_{4/2}$] OPI: 2-ethyl-1-(4-methoxyphenyl)-1-hexanon-2-oxy and

[HSi(OPI)$_2$O$_{1/2}$]$_2$[SiMe$_2$O$_{2/2}$]$_{121}$[Si(CH$_2$)$_3$OOCCH = CH$_2$MeO$_{2/2}$][SivinylMeO$_{2/2}$]$_4$[Si((CH$_2$)$_3$SH)MeO$_{2/2}$]$_2$ OPI: 1-(3,4-dimethylphenyl)-2-methyl-1-propanon-2-oxy, preferred compounds being

[HSi(OMe)(OPI)O$_{1/2}$]$_2$[SiMe$_2$O$_{2/2}$]$_{65}$[SivinylMeO$_{2/2}$]$_4$-[Si((CH$_2$)$_3$SH)MeO$_{2/2}$]$_2$ OPI: 1-(3,4-dimethylphenyl)-2-methyl-1-propanon-2-oxy,

[HSi(OPI)MeO$_{1/2}$]$_2$[SiMe(CH$_2$)$_3$OCH$_2$CH(SH)CH$_2$SHO$_{2/2}$]$_{11}$[SiMevinylO$_{2/2}$]$_{35}$[SiMe$_2$O$_{2/2}$]$_{67}$ OPI: 2-methyl-1-phenyl-1-propanon-2-oxy,

[HSi(OEt)(OPI)O$_{1/2}$]$_2$[SiMe$_2$O$_{2/2}$]$_{94}$[SiMeCH$_2$CH = CH$_2$O$_{2/2}$]$_5$[SiMe(CH$_2$)$_3$OOC(CH$_2$)$_2$SHO$_{2/2}$]$_3$ OPI: 2-methyl-1-phenyl-1-propanon-2-oxy,

[HSi(OPI)(OEt)O$_{1/2}$]$_2$[SiMe$_2$O$_{2/2}$]$_{65}$[SivinylMeO$_{2/2}$]$_4$-[Si((CH$_2$)$_3$SH)MeO$_{2/2}$]$_2$ OPI: 2-methyl-1-phenyl-1-propanon-2-oxy,

[HSi(OPI)$_2$O$_{1/2}$]$_2$[SiMe$_2$O$_{2/2}$]$_{65}$[SivinylMeO$_{2/2}$]$_4$-[Si((CH$_2$)$_3$SH)MeO$_{2/2}$]$_2$ OPI: 2-methyl-1-phenyl-1-propanon-2-oxy,

[HSi(OPI)(OEt)O$_{1/2}$]$_2$[SiMe$_2$O$_{2/2}$]$_{65}$[SivinylMeO$_{2/2}$]$_5$-[Si((CH$_2$)$_3$SH)MeO$_{2/2}$]$_2$ OPI: 1-hydroxycyclohexyl phenyl ketone,

[HSi(OPI)$_2$O$_{1/2}$]$_2$[SiMe$_2$O$_{2/2}$]$_{65}$[SivinylMeO$_{2/2}$]$_5$-[Si((CH$_2$)$_3$SH)MeO$_{2/2}$]$_2$ OPI: 1-hydroxycyclohexyl phenyl ketone,

[HSi(OMe)(OPI)O$_{1/2}$]$_2$[SiMe$_2$O$_{2/2}$]$_{65}$[SivinylMeO$_{2/2}$]$_4$-[Si((CH$_2$)$_3$SH)MeO$_{2/2}$]$_2$ OPI: 2-methyl-1-phenyl-1-propanon-2-oxy,

[HSi(OPI)$_2$O$_{1/2}$][HSi(OMe)(OPI)O$_{1/2}$][SiMe$_2$O$_{2/2}$]$_{68}$-[SivinylMeO$_{2/2}$]$_6$[Si((CH$_2$)$_3$SH)MeO$_{2/2}$]$_4$ OPI: 1-hydroxycyclohexyl phenyl ketone,

[HSi(OPI)$_2$O$_{1/2}$][HSi(OMe)(OPI)O$_{1/2}$][SiMe$_2$O$_{2/2}$]$_{68}$-[SivinylMeO$_{2/2}$]$_6$[Si((CH$_2$)$_3$SH)MeO$_{2/2}$]$_4$ OPI: 2-methyl-1-phenyl-1-propanon-2-oxy,

[HSi(OMe)(OPI)O$_{1/2}$]$_2$[SiMe$_2$O$_{2/2}$]$_{65}$[SivinylMeO$_{2/2}$]$_4$-[Si((CH$_2$)$_3$SH)MeO$_{2/2}$]$_4$ OPI: 1-hydroxycyclohexyl phenyl ketone and

[HSi(OPI)MeO$_{1/2}$]$_2$[SiMe$_2$O$_{2/2}$]$_{112}$[Si(CH$_2$)$_4$CH = CH$_2$MeO$_{2/2}$]$_4$[Si((CH$_2$)$_6$SH)MeO$_{2/2}$]$_2$ OPI: 2-methyl-1-phenyl-1-propanon-2-oxy and particularly preferred compounds being

[HSi(OPI)(OEt)O$_{1/2}$]$_2$[SiMe$_2$O$_{2/2}$]$_{65}$[SivinylMeO$_{2/2}$]$_4$-[Si((CH$_2$)$_3$SH)MeO$_{2/2}$]$_2$ OPI: 2-methyl-1-phenyl-1-propanon-2-oxy,

[HSi(OPI)$_2$O$_{1/2}$]$_2$[SiMe$_2$O$_{2/2}$]$_{65}$[SivinylMeO$_{2/2}$]$_4$-[Si((CH$_2$)$_3$SH)MeO$_{2/2}$]$_2$ OPI: 2-methyl-1-phenyl-1-propanon-2-oxy,

[HSi(OPI)(OEt)O$_{1/2}$]$_2$[SiMe$_2$O$_{2/2}$]$_{65}$[SivinylMeO$_{2/2}$]$_5$-[Si((CH$_2$)$_3$SH)MeO$_{2/2}$]$_2$ OPI: 1-hydroxycyclohexyl phenyl ketone,

[HSi(OPI)$_2$O$_{1/2}$]$_2$SiMe$_2$O$_{2/2}$]$_{65}$[SivinylMeO$_{2/2}$]$_5$-[Si((CH$_2$)$_3$SH)MeO$_{2/2}$]$_2$ OPI: 1-hydroxycyclohexyl phenyl ketone,

[HSi(OMe)(OPI)O$_{1/2}$]$_2$[SiMe$_2$O$_{2/2}$]$_{65}$[SivinylMeO$_{2/2}$]$_4$-[Si((CH$_2$)$_3$SH)MeO$_{2/2}$]$_2$ OPI: 2-methyl-1-phenyl-1-propanon-2-oxy,

[HSi(OPI)$_2$O$_{1/2}$][HSi(OMe)(OPI)O$_{1/2}$][SiMe$_2$O$_{2/2}$]$_{68}$-[SivinylMeO$_{2/2}$]$_6$[Si((CH$_2$)$_3$SH)MeO$_{2/2}$]$_4$ OPI: 1-hydroxycyclohexyl phenyl ketone,

[HSi(OPI)$_2$O$_{1/2}$][HSi(OMe)(OPI)O$_{1/2}$][SiMe$_2$O$_{2/2}$]$_{68}$-[SivinylMeO$_{2/2}$]$_6$[Si((CH$_2$)$_3$SH)MeO$_{2/2}$]$_4$ OPI: 2-methyl-1-phenyl-1-propanon-2-oxy,

[HSi(OMe)(OPI)O$_{1/2}$]$_2$[SiMe$_2$O$_{2/2}$]$_{65}$[SivinylMeO$_{2/2}$]$_4$-[Si((CH$_2$)$_3$SH)MeO$_{2/2}$]$_2$ OPI: 1-hydroxycyclohexyl phenyl ketone and

[HSi(OPI)MeO$_{1/2}$]$_2$[SiMe$_2$O$_{2/2}$]$_{112}$[Si(CH$_2$)$_4$CH = CH$_2$MeO$_{2/2}$]$_4$[Si((CH$_2$)$_6$SH)MeO$_{2/2}$]$_2$ OPI: 2-methyl-1-phenyl-1-propanon-2-oxy and wherein Me denotes the methyl radical, Et denotes the ethyl radical, Pr denotes the propyl radical, Ph denotes the phenyl radical and vinyl denotes the vinyl radical.

The organo(poly)siloxanes according to the invention which contain siloxane units (B) and (C) preferably have a viscosity at 25° C. of 1 to $1 \times 10^6$ mPa.s, particularly preferably 30 to $1 \times 10^5$ mPa.s.

The organo(poly)siloxanes according to the invention which contain siloxaneunits (B) and (C) can be prepared by methods which are customary in silicon chemistry. They are prepared, for example, by reaction of siloxanes containing siloxane units (A) and (B) with photoinitiators containing at least one hydroxyl group, such as, for example, 2-hydroxy-2-methyl-1-phenylpropane, 1-benzoylcyclohexan-1-ol and m-hydroxybenzil, by a procedure described in W. Noll "Chemie und Technologie der Silicone (Chemistry and Technology of the Silicones)", Verlag Chemie Weinheim 2nd edition, 1968, page 556, the alcohol formed during the reaction being removed by distillation under the pressure of the surrounding atmosphere or under increased pressure (up to $10^5$ hPa) or reduced pressure (up to $10^{-6}$ hPa) and at a temperature of 20° to 220° C., preferably under a pressure of 900 to 1100 hPa and at a temperature of 30° to 180° C. The stoichiometry of the reaction partners must be chosen so that complete reaction of the siloxane units (A) with the photoinitiators containing at least one hydroxyl group takes place. Photoinitiators which contain at least one hydroxyl group and can furthermore be employed are all the compounds mentioned in DE 2759766 (Merck Patent GmbH; published on 14th Apr. 1989).

The organo(poly)siloxane compositions according to the invention can furthermore contain, for example, organo(poly)siloxanes containing siloxane units (A), organo(poly)siloxanes containing siloxane units (B) and if appropriate organo(poly)siloxanes containing siloxane units (C).

Organo (poly)siloxanes containing siloxane units (A) and processes for their preparation are already known from the international application having the application number PCT/EP91/00795 (Wacker-Chemie GmbH, application date 25th Apr. 1991) and the German application having the application number P4114554.7 (Wacker-Chemie GmbH, application date 25th Apr. 1991).

The organo(poly)siloxanes containing siloxane units (A) are preferably those of the formula

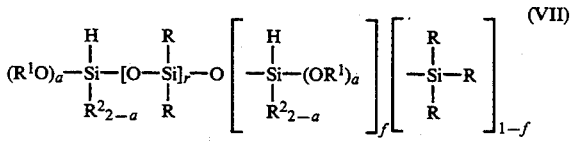

(VII)

wherein

R, $R^1$, $R^2$ and a independently of one another can in each case be identical or different and have one of the meanings given above for these symbols, r is an integer of at least 2, preferably between 10 and 2500, particularly preferably between 10 and 1000 and in particular between 20 and 500 and f is 0 or 1, preferably 1.

Although not shown by formula (VII), up to 50 mol percent of the diorganosiloxane units can be replaced by other siloxane units, such as, for example, $RSiO_{3/2}$ and/or $SiO_{4/2}$ units, wherein R has the meaning given above for this radical. The organo(poly)siloxanes according to formula (VII)—although likewise not shown in formula (VII)—can furthermore contain up to 20 mol percent of other functional groups, such as, for example, hydroxyl groups, resulting from the preparation.

Exhales of organo(poly)siloxanes which are employed in the organo(poly)siloxane compositions according to the invention and contain siloxane units (A) are α,ω-bis(hydridodimethoxysiloxy)dimethylpolysiloxanes, α,ω-bis(hydridodiethoxysiloxy)dimethylpolysiloxanes, α,ω-bis(hydridomethoxymethylsiloxy)dimethylpolysiloxanes, 1,1,3,3-tetraethoxydisiloxane, $(MeO)_2HSiO[SiMe_2O]_nSiMe_3$ and $(EtO)_2$-HSiO$[SiMe_2O]_n$SiMe$_3$, wherein Me denotes the methyl radical and Et denotes the ethyl radical.

The organo(poly)siloxanes containing siloxane units (A) are preferably α,ω-bis(hydridodialkoxysiloxy)dimethylpolysiloxanes, the alkoxy groups of which contain 1 to 3 carbon atom(s), α,ω-bis(hydridodiethoxysiloxy)-dimethylpolysiloxanes being particularly preferred.

The organo(poly)siloxanes employed according to the invention which contain siloxane units (A) have a viscosity at a temperature of 25° C. of preferably 1 to $10^6$ mPa.s, particularly preferably 30 to $1\times10^5$ mPa.s.

Organo(poly)siloxanes containing siloxane units (B) which can be employed are all the siloxanes which have also hitherto been employed in organo(poly)siloxane-based compositions which can be crosslinked by irradiation. In this context, reference may be made to, for example, EP 157540 (Dow Corning Ltd.; published on 9th Oct. 1985), EP 141380 (Dow Corning Corp.; published on 18th Apr. 1990), EP 336633 (Loctite Corp.; published on 11th Oct. 1989), EP 299450 (Wacker-Chemie GmbH; published on 18th Jan. 1989), EP 283896 (Siemens AG, published on 28th Sep. 1988), EP 237757 (Wacker-Chemie GmbH; published on 23rd Sep. 1987), DE 3433654 (Wacker-Chemie GmbH; published on 20th Mar. 1986), DE 2853766 (Dow Corning Corp.; published on 5th Jun. 1980), DE 2850611 (Dow Corning Corp.; published on 7th Jun. 1979), DE 3032626 (Shinetsu Chem Ind KK; published on 19th Mar. 1981), U.S. Pat. No. 4,935,455 (Toshiba Silikone KK; published on 19th Jun. 1990), U.S. Pat. No. 4,849,461 (Dow Corning Corp.; published on 18th Jul. 1989) and U.S. Pat. No. 4,810,731 (Shinetsu Chem Ind KK; published on 7th Mar. 1989).

The organo(poly)siloxanes containing siloxane units (B) can be prepared by methods customary in silicon chemistry, in particular by hydrolysis or cocondensation of chloro-, acyloxy- or alkoxysilanes, preferably under a pressure of 900 to 1100 hPa and at a temperature of 20° to 180° C.

The organo(poly)siloxanes which contain siloxane units (B) and are employed according to the invention have a viscosity at a temperature of 25° C. of preferably 1 to $10^5$ mPa.s, particularly preferably 30 to $1\times10^5$ mPa.s.

Organo (poly)siloxanes containing siloxane units (C) which are preferably employed are those which contain at least one unit of the formula (V).

The present invention furthermore relates to organo(poly)siloxanes which contain at least one unit of the formula

(V)

wherein $R^7$ and $R^8$ independently of one another can in each case be identical or different and denote a monovalent, optionally substituted hydrocarbon radical, Z is identical or different and denotes a group which forms free radicals by irradiation, d is 0 or 1, preferably 1, e is 0 or 1, preferably 0, and g is 1 or 2, preferably 1, with the proviso that in formula (V) the sum of d, e and g is less than or equal to 2.

Examples of the organo(poly)siloxanes which are employed, if appropriate, in the organo(poly)siloxane compositions according to the invention and contain siloxane units (C) according to the invention are

[HSi(OMe)(OPI)O$_{\frac{1}{2}}$]$_2$[SiMe$_2$O$_{2/2}$]$_{84}$ OPI: 2-methyl-1-phenyl-1-propanon-2-oxy,

[HSi(OPI)$_2$O$_{\frac{1}{2}}$]$_2$[SiMe$_2$O$_{2/2}$]$_{65}$ OPI: 2-methyl-1-phenyl-1-propanon-2-oxy,

[HSi(OPI)(OEt)O$_{\frac{1}{2}}$]$_2$[SiMe$_2$O$_{2/2}$]$_{65}$ OPI: 2-methyl-1-phenyl-1-propanon-2-oxy,

[HSi(OPI)(OEt)O$_{\frac{1}{2}}$]$_2$[SiMe$_2$O$_{2/2}$]$_{72}$ OPI: 1-hydroxycyclohexyl phenyl ketone,

[HSi(OPI)(OEt)O$_{\frac{1}{2}}$]$_2$[SiMe$_2$O$_{2/2}$]$_{65}$ OPI: 2-ethyl-1-phenyl-1-hexanon-2-oxy, [HSi(OPI)$_2$O$_{\frac{1}{2}}$]$_1$[HSi(OMe)(OPI)O$_{\frac{1}{2}}$]$_1$[SiMe$_2$O$_{2/2}$]$_{68}$ OPI: 1-hydroxycyclohexyl phenyl ketone, [HSi(OPI)MeO$_{\frac{1}{2}}$]$_2$[SiMe$_2$O$_{2/2}$]$_{67}$ OPI: 2-methyl-1-phenyl-1-propanon-2-oxy,

[HSi(OMe)(OPI)O$_{\frac{1}{2}}$]$_2$[SiMe$_2$O$_{2/2}$]$_{115}$ OPI: 1-(3,4-dimethylphenyl)-2-methyl-1-propanon-2-oxy,

[HSi(OMe)(OPI)O$_{\frac{1}{2}}$]$_2$[SiMe$_2$O$_{2/2}$]$_{65}$ OPI: 2-ethyl-1-(4-tolyl)-1-hexanon-2-oxy,

[HSi(OEt)(OPI)O$_{\frac{1}{2}}$]$_4$[SiMe$_2$O$_{2/2}$]$_{141}$[SiO$_{4/2}$] OPI: 2-ethyl-1-(4-methoxyphenyl)-1-hexanon-2-oxy,

[HSi(OEt)(OPI)O$_{\frac{1}{2}}$]$_2$[SiMe$_2$O$_{2/2}$]$_{11}$ OPI: 1-(3,4-dimethylphenyl)-2-methyl-1-propanon-2-oxy,

[HSiPh(OPI)O$_{\frac{1}{2}}$]$_2$[SiMe$_2$O$_{2/2}$]$_{142}$[SiMePhO$_{2/2}$]$_{14}$ OPI: 1-hydroxy-4-methyl-3-cyclohexen-1-yl phenyl ketone,

[HSiPh(OPI)O$_{\frac{1}{2}}$]$_2$[SiMe$_2$O$_{2/2}$]$_{28}$[SiPh$_2$O$_{2/2}$]$_4$ OPI: 2-methyl-1-phenyl-1-propanon-2-oxy,

[HSiMe(OPI)O$_{\frac{1}{2}}$]$_2$[SiMe$_2$O$_{2/2}$]$_{344}$ OPI: methyl 4-methyl-5-phenyl-5-oxo-pentanoate 4-oxy,

[HSi(O$^n$Pr)(OPI)O$_{\frac{1}{2}}$]$_2$[SiMe$_2$O$_{2/2}$]$_{15}$ OPI: 1-(4-fluorophenyl)-2-methyl-1-propanon-2-oxy,

[HSi(OPI)(OEt)O$_{\frac{1}{2}}$]$_2$[SiMe$_2$O$_{2/2}$]$_{85}$ OPI: 1-(4-methoxyphenyl)-2-methyl-1-propanon-2-oxy,

[HSi(OPI)O$_{2/2}$][SiMe$_2$O$_{2/2}$]$_{65}$[HSi(OPI)(OMe)O$_{\frac{1}{2}}$]$_2$ OPI: 2-methyl-1-phenyl-1-propanon-2-oxy,

[HSi(OPI)$_2$O$_{\frac{1}{2}}$]$_2$[SiMeC$_2$H$_4$CF$_3$O$_{2/2}$]$_{274}$ OPI: 2-methyl-1-(4-methoxyphenyl)-1-propanon-2-oxy, and

[HSi(OPI)MeO$_{\frac{1}{2}}$]$_2$[SiMe$_2$O$_{2/2}$]$_{120}$[SiMePhO$_{2/2}$]$_{24}$ OPI: 1-hydroxy-3,4-dimethyl-3-cyclohexen-1-yl phenyl ketone, preferred compounds being

[HSi(OMe)(OPI)O$_{\frac{1}{2}}$]$_2$[SiMe$_2$O$_{2/2}$]$_{84}$ OPI: 2-methyl-1-phenyl-1-propanon-2-oxy,

[HSi(OPI)$_2$O$_{\frac{1}{2}}$]$_2$[SiMe$_2$O$_{2/2}$]$_{65}$ OPI: 2-methyl-1-phenyl-1-propanon-2-oxy,

[HSi(OPI)(OEt)O$_{\frac{1}{2}}$]$_2$[SiMe$_2$O$_{2/2}$]$_{65}$ OPI: 2-methyl-1-phenyl-1-propanon-2-oxy,

[HSi(OPI)(OEt)O$_{\frac{1}{2}}$]$_2$[SiMe$_2$O$_{2/2}$]$_{72}$ OPI: 1-hydroxycyclohexyl phenyl ketone,

[HSi(OPI)(OEt)O$_{\frac{1}{2}}$]$_2$[SiMe$_2$O$_{2/2}$]$_{65}$ OPI: 2-ethyl-1-phenyl-1-hexanon-2-oxy, [HSi(OPI)$_2$O$_{\frac{1}{2}}$]$_1$[HSi(OMe)(OPI)O$_{\frac{1}{2}}$]$_1$[SiMe$_2$O$_{2/2}$]$_{68}$ OPI: 1-hydroxycyclohexyl phenyl ketone,

[HSi(OPI)MeO$_{\frac{1}{2}}$]$_2$[SiMe$_2$O$_{2/2}$]$_{67}$ OPI: 2-methyl-1-phenyl-1-propanon-2-oxy,

[HSi(OMe)(OPI)O$_{\frac{1}{2}}$]$_2$[SiMe$_2$O$_{2/2}$]$_{115}$ OPI: 1-(3,4-dimethylphenyl)-2-methyl-1-propanon-2-oxy and

[HSi(OMe)(OPI)O$_{\frac{1}{2}}$]$_2$[SiMe$_2$O$_{2/2}$]$_{65}$ OPI: 2-ethyl-1-(4-tolyl)-1-hexanon-2-oxy and particularly preferred compounds being

[HSi(OMe)(OPI)O$_{\frac{1}{2}}$]$_2$[SiMe$_2$O$_{2/2}$]$_{84}$ OPI: 2-methyl-1-phenyl-1-propanon-2-oxy,

[HSi(OPI)$_2$O$_{\frac{1}{2}}$]$_2$[SiMe$_2$O$_{2/2}$]$_{65}$ OPI: 2-methyl-1-phenyl-1-propanon-2-oxy,

[HSi(OPI)(OEt)O$_{\frac{1}{2}}$]$_2$[SiMe$_2$O$_{2/2}$]$_{65}$ OPI: 2-methyl-1-phenyl-1-propanon-2-oxy, [HSi(OPI)(OEt)O$_{\frac{1}{2}}$]$_2$[SiMe$_2$O$_{2/2}$]$_{72}$ OPI: 1-hydroxycyclohexyl phenyl ketone and

[HSi(OPI)(OEt)O$_{\frac{1}{2}}$]$_2$[SiMe$_2$O$_{2/2}$]$_{65}$ OPI: 2-ethyl-1-phenyl-1-hexanon-2-oxy and wherein Me denotes the methyl radical, Et denotes the ethyl radical, Pr denotes the propyl radical and Ph denotes the phenyl radical.

The organo(poly)siloxanes according to the invention containing siloxane units (C) can be prepared by methods customary in silicon chemistry. For example, they are prepared by reacting siloxanes containing siloxane units (A) with photoinitiators containing at least one hydroxyl group, such as, for example. 2-hydroxy-2-methyl-1-phenylpropane, 1-benzoylcyclohexan-1-ol and m-hydroxybenzil, by a procedure described in W. Noll "Chemie und Technologie der Silicone (Chemistry and Technology of the Silicones)", Verlag Chemie Weinheim, 2nd edition, 1968, page 556, the alcohol formed during the reaction being removed by distillation under the pressure of the ambient atmosphere or under increased pressure (up to $10^5$ hPa) or reduced pressure (down to $10^{-6}$ hPa) and at a temperature of 20° to 220° C., preferably under a pressure of 900 to 1100 hPa and at a temperature of 30° to 180° C. The stoichiometry of the reaction participants must be chosen so that all the siloxane units (A) are reacted. All the compounds mentioned in DE 2759766 (Merck Patent GmbH; published on 14th Apr. 1989) can furthermore be employed as photoinitiators which contain at least one hydroxyl group.

The photoinitiators containing at least one hydroxyl group can furthermore also be reacted with trialkoxysilanes, instead of siloxanes containing siloxane units (A), under the abovementioned conditions.

The organo(poly)siloxanes which are employed, if appropriate, and contain siloxane units (C) have a viscosity at a temperature of 25° C. of preferably 1 to $10^6$ mPa.s, particularly preferably 30 to $1 \times 10^5$ mPa.s.

All the siloxanes which have units which act as a photoinitiator and have also hitherto been employed in organo(poly)siloxane-based compositions which can be crosslinked by irradiation can furthermore be employed as organo(poly)siloxanes containing siloxane units (C). In this context, reference may be made to, for example, U.S. Pat. No. 4,477,326 (Loctite Corp.; published on 16th Oct. 1984), U.S. Pat. No. 4,507,187 (Loctite Corp.; published on 26th Mar. 1985), EP 228,145 (Loctite Corp.; published on 8th Jul. 1987), U.S. Pat. No. 4,273,907 (Shin-Etsu Chemical Co., Ltd.; published on 16th Jun. 1981) and U.S. Pat. No. 4,534,838 (Loctite Corp.; published on 13th Aug. 1985).

All the conceivable combinations of organo(poly)siloxanes having siloxane units (A) and/or siloxane units (B) and/or siloxane units (C) can be contained in the organo(poly)siloxane compositions according to the invention provided that siloxane units (A), siloxane units (B) and if appropriate siloxane units (C) are present in the compositions according to the invention. The desired degree of crosslinking can be established via the number of siloxane units (A) and/or (B) per siloxane molecule and the concentration of these siloxane units in the organo(poly)siloxane compositions according to the invention.

The siloxane units (A), (B) and if appropriate (C) of the organo(poly)siloxane compositions according to the invention can each be a single type of such siloxane units or a mixture of in each case different types of such siloxane units.

The high-energy radiation used for crosslinking the organo(poly)siloxane compositions according to the invention is preferably ultraviolet light. However, the high-energy radiation can also be, for example, X-rays, gamma rays or electron beams or the simultaneous use of at least two different types of such radiation.

In the case of electron beams as the high-energy radiation, 1 to 4 mrad is sufficient. The ultraviolet light which is particularly preferred is that having wavelengths in the range from 200 to 400 nm.

For the partial crosslinking by moisture, for example in the shade regions, the presence of atmospheric moisture and traces of Brönsted acids, such as, for example, carbonic acid, which is formed from the carbon dioxide in the air, or cleavage products of photoinitiators, such as, for example, benzoic acid, is sufficient.

The crosslinking of the organo(poly)siloxane compositions according to the invention on access of moisture and also by irradiation preferably takes place at temperatures from 10° to 150° C., particularly preferably from 20° to 80° C., and under a pressure of preferably 900 to 1100 hPa.

If the radiation used to crosslink the organo(poly)-siloxane compositions according to the invention is ultraviolet light, the compositions according to the invention preferably contain at least one siloxane unit (C) and/or at least one photoinitiator (D).

Preferred photoinitiators (D) are those which are soluble in organo(poly)siloxanes, such as, for example, 2-hydroxy-2-methyl-1-phenylpropan-1-one and 2,4-bis(-trimethylsiloxy)-benzophenone.

Other examples of suitable photoinitiators (D) are benzophenone and substituted benzophenones, benzoin and substituted benzoins and benzil and substituted benzils. Specific compounds which may be mentioned are: acetophenone, 2-ethoxy-2-methylacetophenone, trichlorobutylacetophenone, 2-ethoxy-2-phenylacetophenone, mesityl oxide, propiophenone, benzophenone, xanthone, thioxanthone, fluorenone, benzaldehyde, fluorene, anthraquinone, carbazole, 3-methylacetophenone, 4-methylacetophenone, 3-bromoacetophenone, 4-methylbenzophenone, 4-chlorobenzophenone, 4,4-dimethoxybenzophenone, 4-chloro-4'-benzylbenzophenone, 3-chloroxanthone, 3,9-dichloroxanthone, 3-chloro-8-nonylxanthone, chloroanthraquinone, benzoin methyl ether, benzil, benzil ketals, hydroxybenzophenones and 2-methyl-1-[4-(methylthio)phenyl]-2-morpholinopropan-1-one.

If such a photoinitiator (D) is used, it is preferably employed in amounts of 0.05 to 10% by weight, particularly preferably 0.1 to 3% by weight, in each case based on the total weight of the organo(poly)siloxane compositions according to the invention.

The organo(poly)siloxane compositions according to the invention can contain, in addition to siloxane units (A), siloxane units (B) and if appropriate siloxane units (C) and/or photoinitiator (D), further substances, such as Brönsted acids, organo(poly)siloxanes which contain neither siloxane units of the type (A), nor those of the type (B), nor those of the type (C), reactive diluents, solvents, dyestuffs, pigments, adhesion promoters, heat stabilisers, light stabilisers and inhibitors, provided that these additional substances do not reduce the storage stability of the compositions according to the invention, as is the case, for example, with basic substances.

Examples of Brönsted acids which accelerate the crosslinking of the organo(poly)siloxane compositions according to the invention by moisture are nonanoic acid, isononanoic acid, 2-ethylhexanoic acid, oleic acid, calcium 2-ethylhexanoate and stearic acid, oleic acid, 2-ethylhexanoic acid and calcium 2-ethylhexanoate preferably being employed and oleic acid particularly preferably being employed.

In addition to Brönsted acids, it is of course furthermore also possible for all the other condensation catalysts which have hitherto been used in organo(poly)-siloxane compositions which can be stored with the exclusion of moisture but can be crosslinked on access of moisture to be employed in the organo(poly)siloxane compositions according to the invention, although this is not preferred.

Examples of such other condensation catalysts are organotin compounds, such as dibutyltin dilaurate and dibutyltin diacetate, organotitanium compounds, organozirconium compounds and organoaluminium compounds.

The condensation catalyst is preferably employed in the organo(poly)siloxane compositions according to the invention in amounts of 0 to 10% by weight, particularly preferably 50 ppm (parts per million) to 3% by weight, in particular 0.5% by weight, in each case based on the total weight of the organo(poly)siloxane composition according to the invention.

Examples of organo(poly)siloxanes which contain neither siloxane units of the type (A) nor those of the type (B) nor those of the type (C) are $\alpha,\omega$-(trimethylsilyl)dimethylpolysiloxanes having a viscosity at 25° C. of between 5 and 10,000 mPa.s, $\alpha,\omega$-(trimethylsilyl)-dimethylpolysiloxanes having a viscosity of between 10 and 1000 mPa.s preferably being employed, and those having a viscosity of between 10 and 100 mPa.s particularly preferably being employed.

If organo(poly)siloxanes which contain neither siloxane units of the type (A), nor those of the type (B), nor those of the type (C) are used, these are employed in amounts of 0.1 to 20% by weight, particularly preferably 1 to 10% by weight, in each case based on the total weight of the organo(poly)siloxane composition according to the invention.

Reactive diluents are substances which reduce the viscosity of the organo(poly)siloxane composition according to the invention and increase the hardness of the vulcanisate formed after crosslinking of the composition according to the invention. The reactive diluent should be miscible with at least one organopolysiloxane of the composition according to the invention, and should react during the crosslinking process so that it becomes a constituent of the vulcanisate formed by crosslinking of the composition according to the invention.

Examples of reactive diluents are isobornyl acrylate, butanediol diacrylate, cyclohexyl acrylate, 2-ethylhexyl acrylate, glycerol triacrylate, trialkoxysilanes and partial hydrolysis products thereof, triacyloxysilanes and partial hydrolysis products thereof, siloxane resins which contain alkoxy functional groups and have a viscosity of 15 to 2000 mPa.s, silanes containing alkenyl functional groups and partial hydrolysis products thereof, pentaerythritol triacrylate, pentaerythritol tetraacrylate, cyclododecatriene and cohydrolysis products of silanes having alkenyl functional groups with alkoxysilanes, trialkoxysilanes and partial hydrolysis products thereof, triacyloxysilanes and partial hydrolysis products thereof and siloxane resins containing alkoxy functional groups and having a viscosity of 15 to 2000 mPa.s preferably being employed, and siloxane resins containing alkoxy functional groups and having a viscosity of 15 to 2000 mPa.s particularly preferably being employed.

The reactive diluent is preferably employed in the organo(poly)siloxane compositions according to the invention in amounts of 0 to 30% by weight, particularly preferably 1 to 20% by weight, in particular 10% by weight, in each case based on the total weight of the organo(poly)siloxane composition according to the invention.

Examples of solvents are alkanes, such as, for example, pentans, isopentane, hexane, heptane and isooctane, aromatics, such as, for example, benzene, toluene, xylenes and mesitylene, halogenated hydrocarbons, such as, for example, methylene chloride, chloroform and 1,2,3-trichloropropane, carboxylic acid esters, such as, for example, butyl acetate and ethyl acetate, ethers, such as, for example, diethyl ether, tetrahydrofuran, methyl (tert)-butyl ether and dibutyl ether, or mixtures of various solvents, mixtures of alkanes and ethers being preferred, in particular a mixture of heptane and methyl (tert)-butyl ether.

The term solvent does not mean that all the other components must dissolve therein.

The solvent is preferably employed in amounts of 0 to 50% by weight, particularly preferably 1 to 30% by weight, in particular 10% by weight, in each case based on the total weight of the organo(poly)siloxane composition according to the invention.

Examples of adhesion promoters are γ-glycidoxypropyltriacetoxysilane and partial hydrolysis products thereof, γ-glycidoxypropyltrialkoxysilane and partial hydrolysis products thereof, organo(poly)siloxanes containing γ-glycidoxypropyl functional groups and silanes containing carboxylic acid anhydride functional groups, such as, for example, 2-(1-trialkoxysilyl-3-propyl)succinic anhydride, and partial hydrolysis products thereof.

Since the adhesion of the vulcanisates formed by crosslinking from the organo(poly)siloxane compositions according to the invention to the substrates on which they have been produced is in general very good, adhesion promoters can usually be dispensed with.

However, if an adhesion promoter is employed, amounts of between 0.1 and 5% by weight, based on the total weight of the organo(poly)siloxane composition according to the invention, are preferred.

To prepare the organo(poly)siloxane compositions according to the invention, all the constituents of the particular composition can be mixed with one another in any desired sequence. The mixing is preferably carried out at room temperature.

If the organo(poly)siloxane compositions according to the invention are prepared from more than one component, storage in the presence of moisture should be excluded in the case of those components which contain organo(poly)siloxanes having siloxane units (A).

Those components which contain organo(poly)siloxanes having siloxane units (B) should be stored under protection from light.

If the organo(poly)siloxane compositions according to the invention consist of a single component, storage under the exclusion of moisture and light rays should be guaranteed.

The organo(poly)siloxane compositions according to the invention have a viscosity at 25° C. of preferably 1 to $1 \times 10^6$ mPa.s, particularly preferably 30 to $1 \times 10^6$ mPa.s.

The organo(poly)siloxane compositions according to the invention can be employed for all purposes for which compositions which can be crosslinked on access of moisture and/or by irradiation have also hitherto been employed, in particular for the production of coatings.

Examples of substrates to which the organo(poly)siloxane compositions according to the invention can be applied for the production of coatings are ceramic objects or glass, including glass fibres, which in turn includes optical fibres, paper, such as kraft paper or glassine paper, card, including that of asbestos, regenerated cellulose film, wood, cork, films of plastic, for example polyethylene films or polypropylene films, woven or non-woven cloth of naturally occurring fibres or synthetic organic fibres or glass fibres, metals, such as aluminium foils, kraft paper coated with polyethylene or card coated with polyethylene. Where polyethylene has been mentioned above, this can in each case be high pressure, medium pressure or low pressure polyethylene.

Application of the organo(poly)siloxane compositions according to the invention to the substrate to be coated can be carried out in any desired manner which is suitable and widely known for the production of coatings from liquid substances, for example by dipping, brushing, pouring, spraying, rolling or knife or doctor-blade coating.

The organo(poly)siloxane compositions according to the invention are excellently suitable for embedding electrical or electronic components.

Examples of electronic components which can be embedded using the organo(poly)siloxane compositions according to the invention are hybrid switching circuits, for example for electronic ignitions, modules, photovoltaic solar generators and other semiconductor arrangements.

When used for the production of coatings or for embedding electrical or electronic components, the organo(poly)siloxane compositions according to the invention are preferably precrosslinked by ultraviolet light, the irradiation time preferably being chosen so that a surface which is dry to the touch forms on the vulcanisate. After-crosslinking of the irradiated vulcanisate components or crosslinking in the shadow regions is then carried out by moisture-crosslinking of the siloxane units (A) contained in the organo(poly)siloxane composition according to the invention, preferably in air. The rate of this crosslinking is faster, the higher the content of siloxane units (A) in the organo(poly)siloxane composition according to the invention, the higher the concentration of the condensation catalyst and the higher the relative atmospheric humidity.

The organo(poly)siloxane compositions according to the invention have the advantage that they crosslink very quickly. In particular, the rate of crosslinking on access of moisture, which is already catalysed by traces of Brönsted acids or by dissociation products of photoinitiators, is very high, so that the addition of metal-containing condensation catalysts which are otherwise customary in compositions which crosslink under the influence of moisture and in general reduce the storage stability of such compositions can be dispensed with.

In the examples described below, all the parts and percentages data relate to the weight, unless stated otherwise. Unless stated otherwise, the following examples are carried out under a pressure of the ambient atmosphere, that is to say under about 1000 hPa, and at room temperature, that is to say at about 23° C., or at a temperature which is established without additional heating or cooling when the reactants are brought together at room temperature. Unless stated otherwise, the relative atmospheric humidity here is between 60 and 80%.

All the viscosity data below are based on a temperature of 25° C.

EXAMPLE 1 a) Preparation of an organopolysiloxane containing siloxane units (A) (siloxane A1)

2590 g of α,ω-dihydroxydimethylpolysiloxane having on average 350 dimethylsiloxy units and a viscosity of about 1000 mPa, 65.6 g of hydridotriethoxysilane and 13 g of pentanedione are mixed thoroughly, with exclusion of moisture, heated to 100° C. and stirred at 100° C. for one hour and the volatile constituents are removed by brief evacuation (15 minutes/1 mbar). The mixture is then filtered over cellulose. 2605 g of a clear colourless oil which has a viscosity of 1480 mPa.s and, according to $^{29}$Si-NMR spectroscopy, contains 91% of H—Si—(OEt)$_2$ end groups, based on the number of all end groups, are obtained.

b) Preparation of an organopolysiloxane containing siloxane units (B) (siloxane B1)

1036 g of α,ω-dihydroxydimethylpolysiloxane having a viscosity of 20,000 mPa.s, 70.5 g of vinyldimethylchlorosilane (0.5 mol), 21.7 g of trimethylchlorosilane (0.2 mol), 54 g of dimethoxymethyl(3-mercaptopropyl)-silane (0.3 mol) and 0.1 g of PNCl$_2$ are stirred at a temperature of 80° C. for 5 hours, 160 g of water are added and the volatile constituents are then distilled off. A colourless clear oil which has a viscosity of 580 mPa.s and the average formula

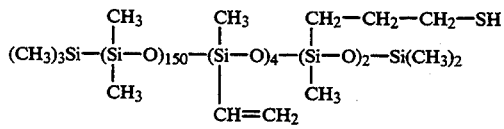

is obtained as the product.

10 parts of the siloxane (A1) described above are mixed thoroughly with one part of the siloxane (B1) described above and 0.4 part of 2-methyl-1-phenyl-propan-2-ol-1-one (commercially obtainable under the name Darocure 1173 from Merck, D-Darmstadt). The mixture thus obtained, which is a clear colourless oil having a viscosity of 1200 mPa.s, is applied to a sheet of glass by means of a doctor blade, the coating thickness being about 0.1 mm. A sample of the substrate coated in this way is irradiated in the presence of air, the coating curing completely with a dry surface after 2 seconds of ultraviolet radiation with an output of 80 watt/cm of luminous length and output maxima at a wavelength of 313 nm and 361 nm at a distance of 15 cm from the surface to be crosslinked (UV laboratory drier type 22/3 from Bentron GmbH, D-Rödermark). In the case of another sample of the substrate coated in this way, which is left to stand in the presence of air and with exclusion of natural light, the skin formation time is two hours.

EXAMPLE 2 a) Preparation of an organopolysiloxane containing siloxane units (A) (siloxane A2)

2590 g of α,ω-dihydroxydimethylpolysiloxane having on average 70 dimethylsiloxyunits and a viscosity of about 75 mPa.s, 328 g of hydridotriethoxysilane and 15 g of pentanedione are mixed thoroughly, with exclusion of moisture, heated to 100° C. and stirred at 100° C. for one hour, and the volatile constituents are removed by brief evacuation (15 minutes/1 mbar). The mixture is then filtered over cellulose. 2703 g of a clear colourless oil which has a viscosity of 120 mPa.s and, according to $^{29}$Si-NMR spectroscopy, contains 94% of H—Si—(O-Et)$_2$ end groups, based on the number of all the end groups, are obtained.

10 parts of the siloxane (A2) described above are mixed thoroughly with two parts of an α,ω-bis(acryloxy-n-propyl)dimethylpolysiloxane having on average 13 siloxane units (commercially obtainable under the name VP 1528 from Wacker-Chemie GmbH, D-8000 Munich) and 0.4 part of 2-methyl-1-phenyl-propan-2-ol-1-one (commercially obtainable under the name Darocure 1173 from Merck, D-Darmstadt). The mixture thus obtained, which is a clear colourless oil having a viscosity of 120 mPa.s, is applied to a sheet of glass using a doctor blade, the coating thickness being about 0.1 mm. A sample of the substrate coated in this way is irradiated in the presence of air, the coating curing fully with a dry surface after 30 seconds of ultraviolet irradiation with an output of 80 watt/cm of luminous length and output maxima at a wavelength of 313 nm and 361 nm at a distance of 15 cm from the surface to be crosslinked (UV laboratory drier type 22/3 from Bentron GmbH, D-Rödermark). In the case of another sample of the substrate coated in this way which is left to stand in the presence of air and with exclusion of natural light, the skin formation time is one hour.

EXAMPLE 3 a) Preparation of an organopolysiloxane containing siloxane units (A) (siloxane A3)

962 g of α,ω-dihydroxydimethylpolysiloxane having on average 13 dimethylsiloxy units and a viscosity of about 10 mPa.s, 656 g of hydridotriethoxysilane and 8.1 g of pentanedione are mixed thoroughly, with exclusion of moisture, heated to 100° C. and stirred at 100° C. for one hour and the volatile constituents are removed by brief evacuation (15 minutes/1 mbar). The mixture is then filtered over cellulose. 1086 g of a clear colourless oil which has a viscosity of 7 mPa.s and contains, according to $^{29}$Si-NMR spectroscopy, 92% of H—Si—(OEt)$_2$ end groups, based on the number of all the end groups, are obtained.

6 parts of the siloxane (A3) described above are mixed thoroughly with three parts of an α,ω-bis(acryloxy-n-propyl)diorganopolysiloxane which has on average 190 siloxane units and contains, as diorganosiloxygroups, in addition to dimethylsiloxy units, 4 vinylmethyl units and 2 HS(CH$_2$)$_3$SiCH$_3$O$_{2/2}$ units (commercially obtainable under the name VP 1529 from Wacker-Chemie GmbH, D-8000 Munich) and 0.01 part of 2-methyl-1-phenyl-propan-2-ol-1-one (commercially obtainable under the name Darocure 1173 from Merck, D-Darmstadt). The mixture thus obtained, which is a clear colourless oil having a viscosity of 128 mPa.s, is applied to a sheet of glass using a doctor blade, the coating thickness being about 0.1 mm. A sample of the substrate coated in this way is irradiated in the presence of air, the coating curing fully with a dry surface after 10 seconds of ultraviolet irradiation with an output of 80 watt/cm of luminous length and output maxima at a wavelength of 313 nm and 361 nm at a distance of 15 cm from the surface to be crosslinked (UV laboratory drier type 22/3 from Bentron GmbH, D-Rödermark). In the case of another sample of the coated substrate which is left to stand in the presence of air and with exclusion of natural light, the skin formation time is 1.5 hours.

EXAMPLE 4

5 parts of the siloxane (A3) described in Example 3 are mixed thoroughly with three parts of an α,ω-bis(acryloxy-n-propyl)diorganopolysiloxane which has on average 190 siloxane units and contains, as diorganosiloxy groups, in addition to dimethylsiloxy units, 4 vinylmethyl units and 2 $HS(CH_2)_3SiCH_3O_{2/2}$ units (commercially obtainable under the name VP 1529 from Wacker-Chemie GmbH, D-8000 Munich), 1 part of an organopolysiloxane resin which contains ethoxy groups and has a viscosity of 25 mPa.s and a ratio of $R'_3SiO_{\frac{1}{2}}$ units:$R'_2SiO_{2/2}$ units:$R'SiO_{3/2}$ units of 1:7:2, R' being the methyl or ethoxy radical (commercially obtainable under the name "VP 7001" from Wacker-Chemie GmbH), 0.01 part of 2-methyl-1-phenyl-propan-2-ol-1-one (commercially obtainable under the name Darocure 1173 from Merck, D-Darmstadt) and 0.01 part of 2-ethylhexanoic acid. The mixture thus obtained, which is a clear colourless oil having a viscosity of 76 mPa.s, is applied to a sheet of glass using a doctor blade, the coating thickness being about 0.1 mm. A sample of the substrate coated in this way is irradiated in the presence of air, the coating curing completely with a dry surface after 10 seconds of ultraviolet irradiation with an output of 80 watt/cm of luminous length and output maxima at a wavelength of 313 nm and 361 nm at a distance of 15 cm from the surface to be crosslinked (UV laboratory drier type 22/3 from Bentron GmbH, D-Rödermark). In the case of another sample of the coated substrate which is left to stand in the presence of air and with exclusion of natural light, the skin formation time is one hour.

EXAMPLE 5 a) Preparation of an organopolysiloxane containing siloxane units (A) and siloxane units (C) (siloxane AC1)

270 g of the siloxane (A3) described in Example 3 are mixed with 36.5 g of 2-methyl-1-phenyl-propan-2-ol-1-one (commercially obtainable under the name Darocure 1173 from Merck, D-Darmstadt) and 2 g of 2-ethylhexanoic acid and the mixture is heated at a temperature of 120° C. for 4 hours, the alcohol formed being distilled off. 292 g of a reaction product which, according to $^{29}$Si-NMR spectroscopy, contains 47% of H—Si—(OEt)(OPI) end groups and 44% of H—Si—(OEt)$_2$ end groups, OPI representing 2-methyl-1-phenyl-1-propanon-2-oxy, based on the number of all the end groups, are obtained.

0.05 part of this siloxane (AC1) described above is mixed thoroughly with 6 parts of the siloxane (A3) described in Example 3, 3 parts of an α,ω-bis(acryloxy-n-propyl)diorganopolysiloxane which has on average 190 siloxane units and contains, as diorganosiloxy groups, in addition to dimethylsiloxy units, 4 vinylmethyl units and 2 $HS(CH_2)_3SiCH_3O_{2/2}$ units (commercially obtainable under the name VP 1529 from Wacker-Chemie GmbH, D-8000 Munich), and 1 part of an organopolysiloxane resin which contains ethoxy groups and has a viscosity of 25 mPa.s and a ratio of $R'_3SiO_{\frac{1}{2}}$ units:$R'_2SiO_{2/2}$ units:$R'SiO_{3/2}$ units of 1:7:2, R' being the methyl or ethoxy radical (commercially obtainable under the name "VP 7001" from Wacker-Chemie GmbH). The mixture thus obtained, which is a clear colourless oil having a viscosity of 127 mPa.s, is applied to a sheet of glass using a doctor blade, the coating thickness being about 0.1 mm. A sample of the substrate coated in this way is irradiated in the presence of air, the coating curing fully with a dry surface after 20 seconds of ultraviolet irradiation with an output of 80 watt/cm of luminous length and output maxim at a wavelength of 313 nm and 361 nm at a distance of 15 cm from the surface to be crosslinked (UV laboratory drier type 22/3 from Bentron GmbH, D-Rödermark). In the case of another sample of the coated substrate which is left to stand in the presence of air and with exclusion of natural light, the skin formation time is 2.5 hours.

EXAMPLE 6 a) Preparation of an organopolysiloxane containing siloxane units (A) and siloxane units (B) (siloxane AB1)

2400 g of α,ω-dihydroxydiorganopolysiloxane which contains, as diorganosiloxy units, on average 60 dimethylsiloxy units, 4 vinylmethylsiloxy units and 2 $HS(CH_2)_3SiCH_3O_{2/2}$ units and has a viscosity of about 100 mPa, 328 g of hydridotriethoxysilane and 13.6 g of pentanedione are mixed thoroughly with exclusion of moisture, heated to 100° C. and stirred at 100° C. for one hour and the volatile constituents are removed by brief evacuation (15 minutes/1 mbar). The mixture is then filtered over cellulose. 2513 g of a clear colourless oil which has a viscosity of 118 mPa.s and contains, according to $^{29}$Si-NMR spectroscopy, 93% of H—Si—(OEt)$_2$ end groups, based on the number of all the end groups, are obtained.

100 parts of the siloxane (AB1) described above are mixed thoroughly with 1 part of oleic acid and 0.2 part of 2-methyl-1-phenyl-propan-2-ol-1-one (commercially obtainable under the name Darocure 1173 from Merck, D-Darmstadt). The mixture thus obtained, which is a clear colourless oil having a viscosity of 116 mPa.s, is applied to a sheet of glass using a doctor blade, the coating thickness being about 0.1 mm. A sample of the substrate coated in this way is irradiated in the presence of air, the coating curing fully with a dry surface after 10 seconds of ultraviolet irradiation with an output of 80 watt/cm of luminous length and output maxima at a wavelength of 313 nm and 361 nm at a distance of 15 cm from the surface to be crosslinked (UV laboratory drier type 22/3 from Bentron GmbH, D-Rödermark). In the case of another sample of the coated substrate which is left to stand in the presence of air and with exclusion of natural light, the skin formation time is 30 minutes.

EXAMPLE 7 a) Preparation of an organopolysiloxane containing siloxane units (A), siloxane units (B) and siloxane units (C) (siloxane ABC1)

A mixture of 100 g of the siloxane (AB1) described in Example 6 with 3.85 g of 1-hydroxycyclohexyl phenyl ketone (commercially obtainable under the name Irgacure 184 from Ciba-Geigy, CH-Basel) and 0.5 g of 2-ethylhexanoic acid is heated on a rotary evaporator at 120° C./1 mbar for one hour, the ethanol liberated being distilled off. 102 g of a clear colourless oil which has a viscosity of 144 mPa.s and, according to $^{29}$Si-NMR spectroscopy, contains 44% of H—Si—(OEt)$_2$ end groups, of H—Si—(OEt)(OPI) end groups and 7% of H—Si—(OPI)$_2$ end groups, OPI representing 1-hydroxycyclohexyl phenyl ketone, based on the number of all the end groups, are obtained.

b) Crosslinking test with siloxane ABC1

100 parts of the siloxane (ABC1) described above are mixed thoroughly with 0.1 part of acetic anhydride. The mixture thus obtained, which is a clear colourless oil having a viscosity of 144 mPa.s, is applied to an aluminium plate using a doctor blade, the coating thickness being about 0.1 mm. A sample of the substrate coated in this way is irradiated in the presence of air, the coating curing fully with a dry surface after 2 seconds of ultraviolet irradiation with an output of 80 watt/cm of luminous length and output maxima at a wavelength of 313 nm and 361 nm at a distance of 15 cm from the surface to be crosslinked (UV laboratory drier type 22/3 from Bentron GmbH, D-Rödermark). In the case of another sample of the substrate coated in this way which is left to stand in the presence of air and with exclusion of natural light, the skin formation time is 90 minutes. In both cases, the vulcanisate can be detached from the substrate only with destruction.

EXAMPLE 8 a) Preparation of an organopolysiloxane containing siloxane units (C) (siloxane C1)

A mixture of 100 g of the siloxane (A2) described in Example 2 with 7 g of 2-methyl-1-phenyl-propan-2-ol-1-one (commercially obtainable under the name Darocure 1173 from Merck, D-Darmstadt) and 0.5 g of 2-ethylhexanoic acid is heated on a rotary evaporator at 120° C./1 mbar for one hour, the ethanol liberated being distilled off. 103 g of a clear colourless oil which has a viscosity of 84 mPa.s and contains, according to $^{29}$Si-NMR spectroscopy, 86% of H—Si—(OEt)(OPI) end groups and 8% of H—Si—(OPI)$_2$ end groups, wherein OPI represents 2-methyl-1-phenyl-1-propanon-2-oxy, based on the number of all the end groups, are obtained.

b) Crosslinking test with siloxane C1

5 parts of the siloxane C1 described above are mixed thoroughly with 50 parts of the siloxane (AB1) described in Example 6 and 0.05 part of oleic acid. The mixture thus obtained, which is a clear colourless oil having a viscosity of 116 mPa.s, is applied to a sheet of glass using a doctor blade, the coating thickness being about 0.1 mm. A sample of the substrate coated in this way is irradiated in the presence of air, the coating curing fully with a dry surface after 5 seconds of ultraviolet irradiation with an output of 80 watt/cm of luminous length and output maxima at a wavelength of 313 nm and 361 nm at a distance of 15 cm from the surface to be crosslinked (UV laboratory drier type 22/3 from Bentron GmbH, D-Rödermark). In the case of another sample of the substrate coated in this way which is left to stand in the presence of air and with exclusion of natural light, the skin formation time is four hours.

EXAMPLE 9 a) Preparation of a siloxane containing siloxane units (B) and siloxane units (C) (BC1)

A mixture of 100 g of the siloxane (AB1) described in Example 6 with 9 g of 2-methyl-1-phenyl-propan-2-ol-1-one (commercially obtainable under the name Darocure 1173 from Merck, D-Darmstadt) and 1 g of oleic acid is heated on a rotary evaporator at 120° C./1 mbar for one hour, the ethanol liberated being distilled off. 108 g of a clear colourless oil which has a viscosity of 158 mPa.s and contains, according to $^{29}$Si-NMR spectroscopy, 61% of H—Si—(OEt)(OPI) end groups and 30% of H—Si—(OPI)$_2$ end groups, wherein OPI represents 2-methyl-1-phenyl-1-propanon-2-oxy, based on the number of all the end groups, are obtained.

b) Crosslinking test with siloxane BC1

50 parts of the siloxane (BC1) described above are mixed thoroughly with 50 parts of the siloxane (A2) described in Example 2. The mixture thus obtained, which is a clear colourless oil having a viscosity of 145 mPa.s, is applied to an aluminium plate using a doctor blade, the coating thickness being about 0.1 mm. A sample of the substrate coated in this way is irradiated in the presence of air, the coating curing fully with a dry surface after 2 seconds of ultraviolet irradiation with an output of 80 watt/cm of luminous length and output maxima at a wavelength of 313 nm and 361 nm at a distance of 15 cm from the surface to be crosslinked (UV laboratory drier type 22/3 from Bentron GmbH, D-Rödermark). In the case of another sample of the substrate coated in this way which is left to stand in the presence of air and with exclusion of natural light, the skin formation time is six hours.

We claim:

1. Organo(poly)siloxane compositions which comprise (A) units of the formula $$(R^1O)_a SiHR^2_{2-a}O_{\frac{1}{2}} \qquad (I)$$

wherein

R$^1$ and R$^2$ independently of one another are identical or different and denote a monovalent, optionally substituted hydrocarbon radical and a is 1 or 2, (B) siloxane units which are crosslinkable by irradiation of the formula $$G_h SiR^3{}_b O_{(4-b-h)/2} \qquad (II)$$

and/or $$R^5{}_c SiR^4{}_f O_{(4-c-f)/2} \qquad (III)$$

wherein

G is identical or different and denotes a monovalent organic radical having at least one thiol group, R$^3$ is identical or different and denotes a monovalent optionally substituted hydrocarbon radical, b is 0, 1 or 2, h is 1, 2 or 3, R$^4$ is a monovalent organic radical having at least one aliphatic carbon-carbon multiple bond, R$^5$ is identical or different and denotes a monovalent, optionally substituted hydrocarbon radical, c is 0, 1 or 2 and i is 1, 2 or 3, with the proviso that the sum of b+h and the sum of c+i is in each case less than or equal to 3, and optionally (C) siloxane photoinitiator units of the formula $$(R^7O)_d R^8_e HZ_g SiO_{(3-d-e-g)/2} \quad (V)$$

wherein $R^7$ is identical or different and denotes a monovalent, optionally substituted hydrocarbon radical, $R^8$ is identical or different and denotes a monovalent, optionally substituted hydrocarbon radical, Z is identical or different and denotes a group which forms free radicals by irradiation, d is 0 or 1, e is 0 or 1 and g is 1 or 2, with the proviso that in formula (V) the sum of d, e and g is less than or equal to 2.

2. Organo(poly)siloxane compositions according to claim 1, characterised in that they comprise units of the general formula $$R_k SiO_{(4-k)/2} \quad (VI)$$

wherein

R is identical or different and denotes a monovalent, optionally substituted hydrocarbon radical and k is 0, 1, 2 or 3.

3. Organo(poly)siloxanes which comprise (A) units of the formula $$(R^1O)_a SiHR^2_{2-a} O_{\frac{1}{2}} \quad (I)$$

wherein $R^1$ and $R^2$ independently of one another are identical or different and denote a monovalent, optionally substituted hydrocarbon radical and a is 1 or 2, (B) siloxane units which are crosslinkable by irradiation.

4. Organo(poly)siloxanes which comprise (A) units of the formula $$(R^1O)_a SiHR^2_{2-a} O_{\frac{1}{2}} \quad (I)$$

wherein $R^1$ and $R^2$ independently of one another are identical or different and denote a monovalent, optionally substituted hydrocarbon radical and a is 1 or 2, (B) siloxane units which are crosslinkable by irradiation and (C) siloxane photoinitiator units.

5. Organo(poly)siloxanes which comprise (A) units of the formula $$(R^1O)_a SiHR^2_{2-a} O_{\frac{1}{2}} \quad (I)$$

wherein $R^1$ and $R^2$ independently of one another are identical or different and denote a monovalent, optionally substituted hydrocarbon radical and a is 1 or 2, (C) siloxane photoinitiator units.

6. Organo(poly)siloxanes which comprise at least one unit of the formula $$(R^7O)_d R^8_e HZ_g SiO_{(3-d-e-g)/2} \quad (V)$$

wherein $R^7$ and $R^8$ independently of one another are identical or different and denotes a monovalent, optionally substituted hydrocarbon radical, Z is identical or different and denotes a group which forms free radicals by irradiation, d is 0 or 1, e is 0 or 1 and g is 1 or 2, with the proviso that in formula (V) the sum of d, e and g is less than or equal to 2.

7. A curable coating comprising the organo(poly)siloxane compositions as claimed in claim 1.

* * * * *